United States Patent
Herbert

(10) Patent No.: US 7,139,180 B1
(45) Date of Patent: Nov. 21, 2006

(54) THREE PHASE BUCK POWER CONVERTERS HAVING INPUT CURRENT CONTROL

(76) Inventor: Edward Herbert, 1 Dyer Cemetery Rd., Canton, CT (US) 06019-2029

( * ) Notice: Subject to any disclaimer, the term of this patent is extended or adjusted under 35 U.S.C. 154(b) by 0 days.

(21) Appl. No.: 11/162,591

(22) Filed: Sep. 15, 2005

Related U.S. Application Data

(60) Provisional application No. 60/522,330, filed on Sep. 15, 2004.

(51) Int. Cl.
 *H02M 7/00* (2006.01)
(52) U.S. Cl. .................................... 363/124
(58) Field of Classification Search ................. 363/34, 363/44, 124, 125, 127, 131
 See application file for complete search history.

(56) References Cited

U.S. PATENT DOCUMENTS

| | | | | |
|---|---|---|---|---|
| 4,384,321 A * | 5/1983 | Rippel | .......................... | 363/124 |
| 5,144,222 A * | 9/1992 | Herbert | .......................... | 323/271 |
| 5,570,279 A * | 10/1996 | Venkataramanan | .......... | 363/127 |
| 6,049,471 A * | 4/2000 | Korcharz et al. | .............. | 363/20 |
| 6,545,887 B1 * | 4/2003 | Smedley et al. | ............... | 363/89 |
| 6,690,585 B1 * | 2/2004 | Betts-LaCroix | ............... | 363/16 |
| 6,826,028 B1 * | 11/2004 | Schuellein | .................. | 361/93.1 |

* cited by examiner

*Primary Examiner*—Adolf Berhane

(57) ABSTRACT

A three phase buck power converter having input power control is described. The power converter uses a three input buck converter comprising switches for each phase, a catch rectifier, an inductor and an output capacitor. The duty cycle of the three switches is constrained to have a sine function relationship that may be derived from the input voltage wave form or from a reference oscillator. When so constrained, the input currents have high power factor. The output is a precise, high quality dc voltage, comparable to the output of a dc—dc buck converter, and the dynamic response is comparable. Voltage mode and current mode controls are shown, as is a precise line regulation feed forward for the voltage mode embodiment. The three phase buck power converter may be operated in reverse as a three phase boost converter, as they are reciprocal. A three phase ac—ac converter may have a three phase buck converter as its input and a three phase boost converter as its output.

21 Claims, 19 Drawing Sheets

Fig. 2  *SPICE simulation*

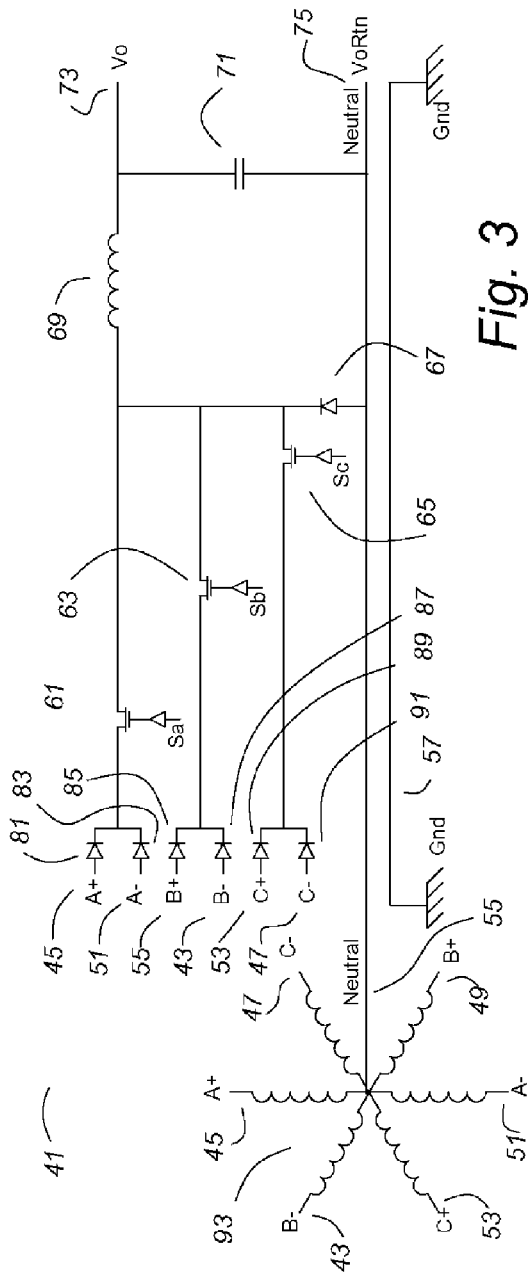
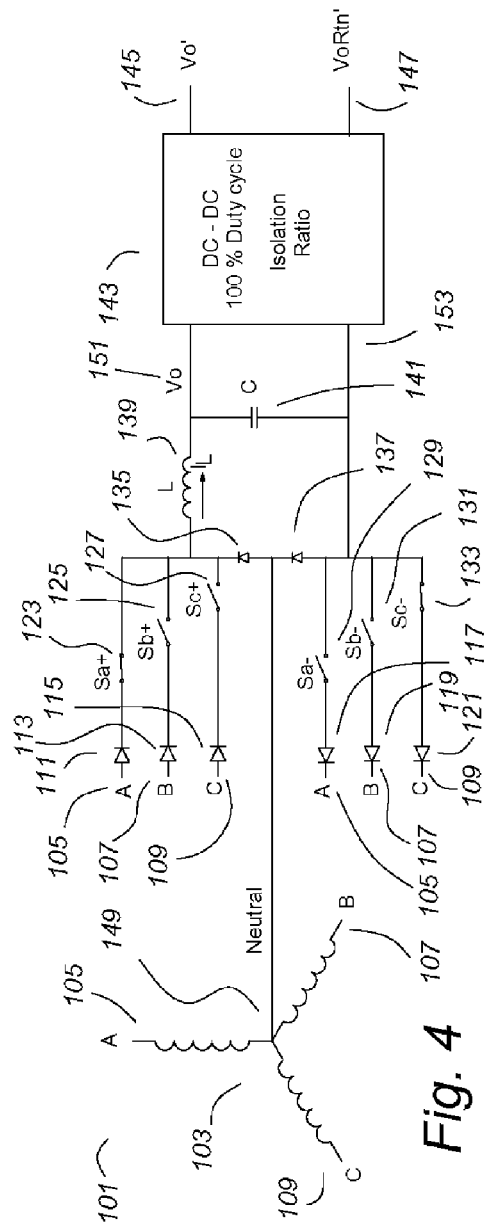
Fig. 3
Fig. 4

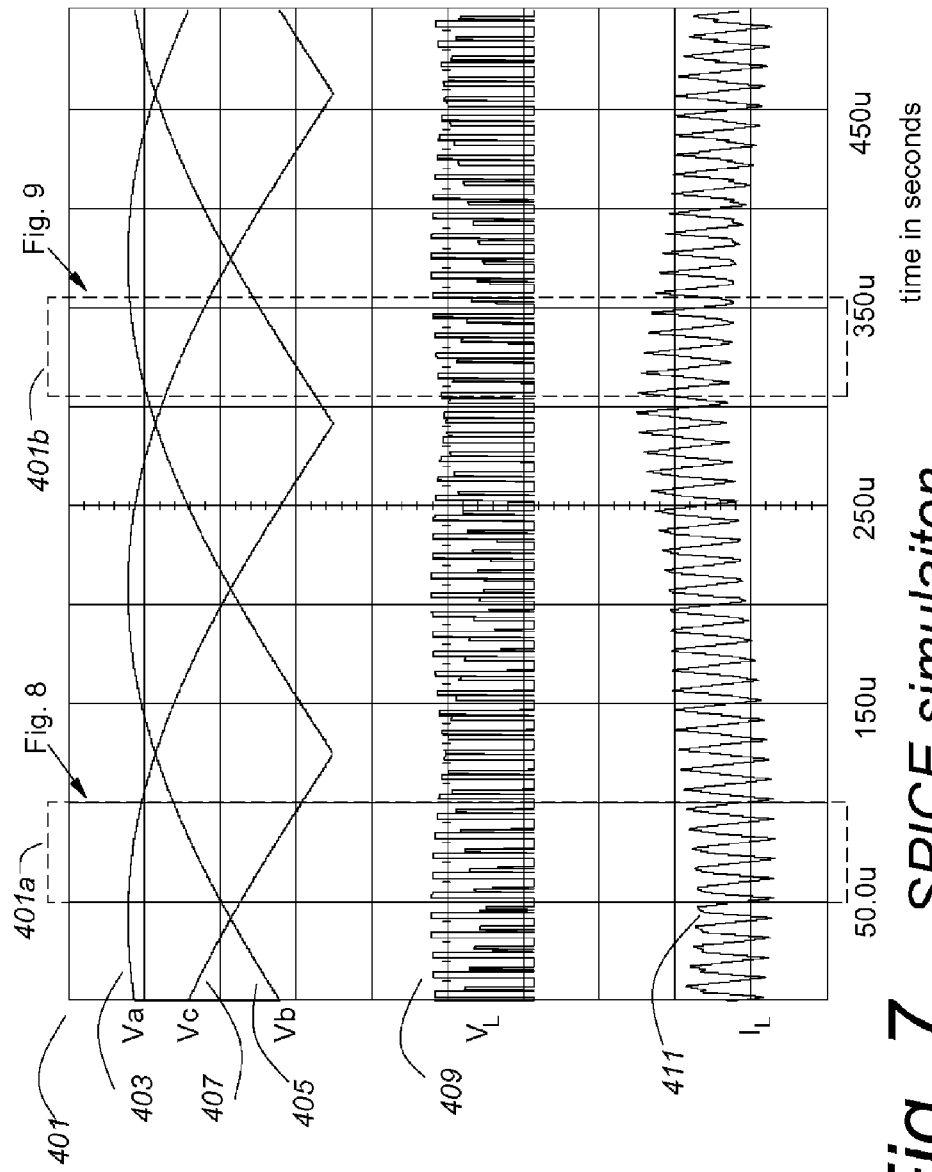
Fig. 7  SPICE simulaiton

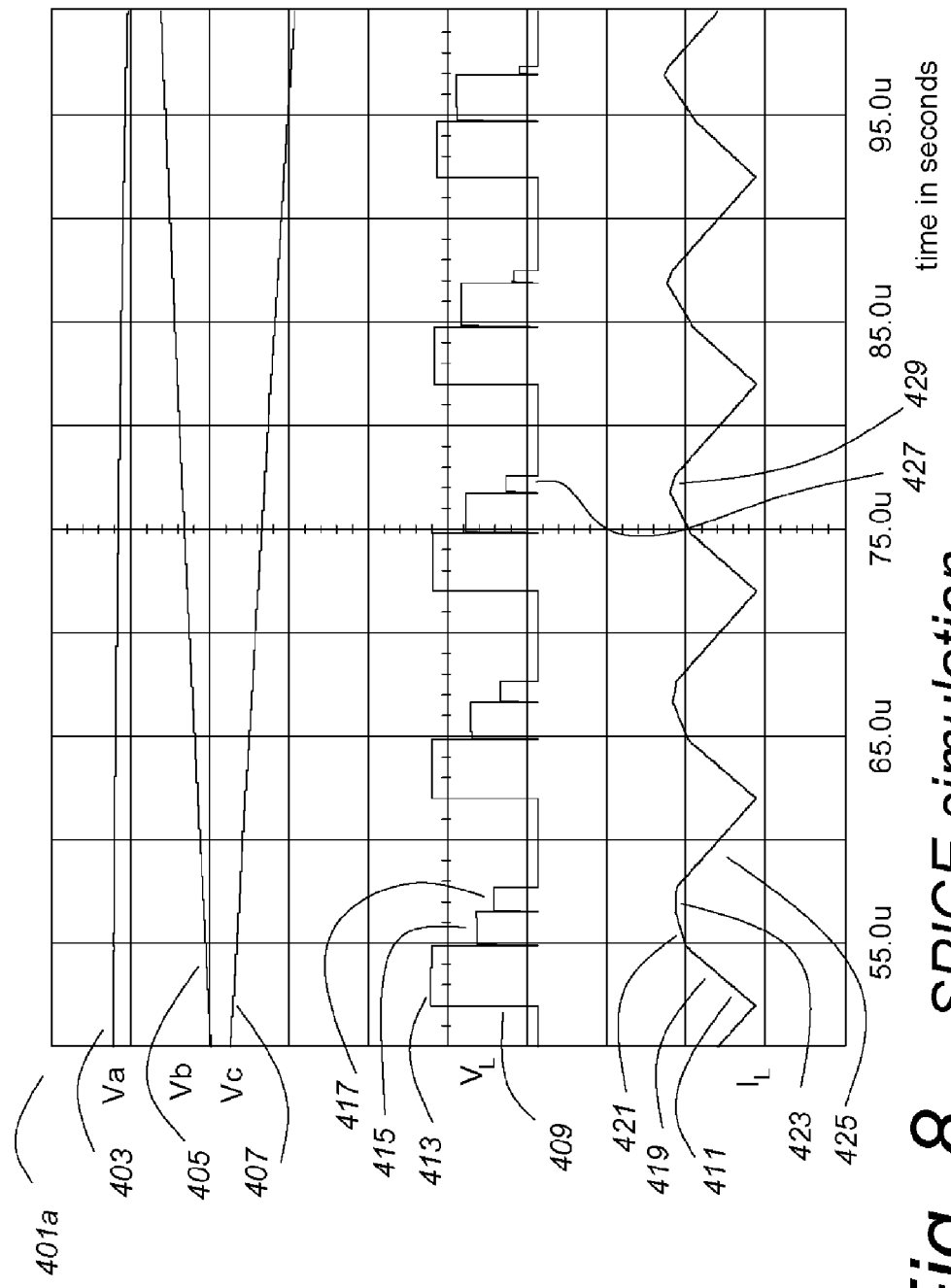
Fig. 8    SPICE simulation

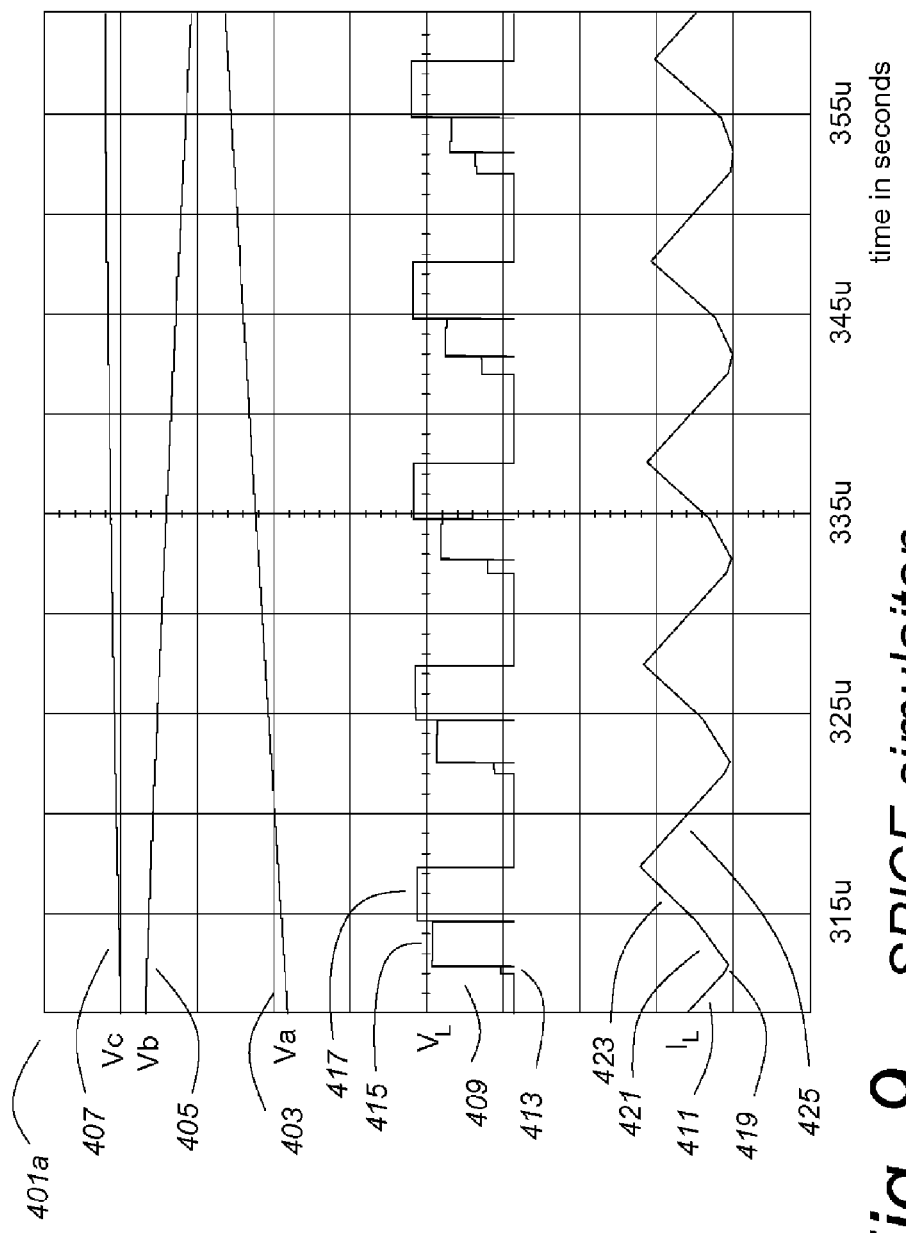
Fig. 9   SPICE simulaiton

Fig. 13 SPICE simulaiton

THREE PHASE BUCK POWER CONVERTERS HAVING INPUT CURRENT CONTROL

CROSS REFERENCE TO RELATED APPLICATIONS

This application claims priority to the filing date of a provisional application entitled "Three Phase Buck Power Converters Having Power Factor Correction", Ser. No. 60/522,330, filed Sep. 15, 2004.

BACKGROUND OF THE INVENTION

This invention relates to power converters, and more particularly to power converters having a three phase ac input and requiring power factor correction. This invention also relates to control of the input current and frequency of free-wheeling power sources, dc to three phase ac conversion and three phase ac to three phase ac power conversion, particularly when the frequencies differ.

Usually power factor correction is accomplished by monitoring the three input currents using three input current shunts or current transformers or the like. A sine wave current reference is also generated for each phase, often using the ac voltage inputs. The measured currents are compared to the current references and a feedback control pulse width modulates the input currents so that they conform to the current references.

The input stages are usually boost converters that boost the input to a high voltage storage capacitor. A buck converter may then convert the energy on the storage capacitor to a useful dc output. Upon application of the input power, large inrush currents occur. Present three phase power converters with power factor correction are notoriously sluggish in their response to transients.

SUMMARY OF THE INVENTION

The present invention teaches a method and apparatus for control of the input currents of a three phase power converter that does not require monitoring of the input currents. Further, a single switching function in each phase generates the necessary voltage and currents so that a single inductor and capacitor will output a useful high quality and precise dc output. Frequency response is comparable to that of a good dc—dc converter. Because buck converters and boost converters enjoy a reciprocal relationship, the teachings of a three phase buck converter can be adapted for three phase boost converters.

With respect to the usual three phase commercial ac power source, it can be considered to be a near ideal voltage source, in that the voltage waveform will not be greatly affected by the load (the power converter input). For these applications, the input voltage is sufficiently solid that it can be used as the voltage and waveform reference, the only concern being variations in the voltage magnitude, which can be compensated.

In the case of a three phase input from a free-wheeling power source, such as a wind or water turbine, an overrunning load or dynamic braking, the voltage, frequency and waveform are not stable, so a master waveform generator must provide a reference having he desired frequency and waveform. The magnitude component is varied, probably by a means for feedback control as the control variable. The frequency and waveform of the model as well as the magnitude can be varied arbitrarily fast so long as they don't exceed the rate at which the free-wheeling power source can follow. The present invention teaches a method of very solid current control, and to a large extent this current control can maintain the desired three phase ac currents whether the voltage is leading or lagging and regardless of its magnitude.

The following discussion is based upon three phase ac buck converters having power factor correction, but the teachings are equally applicable to a free-wheeling power source using reference wave forms and to the reciprocal of the three phase ac buck converter, the three phase ac boost converter with appropriate reconciling nomenclature and possible rearranging and collection of the terms. For instance, in usual jargon, the duty cycle of a buck converter and the duty cycle of a boost converter refer to different switching elements, obscuring the identities that are useful for understanding reciprocity. When reconciled, the reciprocity becomes clear. Also, the equations may wish to solve for the output voltage, and an example, regardless of which end of the reciprocal circuit is the input and output, requiring some algebra to rearrange the equations.

The power and control circuits of the present invention are entirely buck derived, so there are no large inrush currents. In fact, the output voltage and input currents can be controlled to ramp up arbitrarily slowly as a soft start, if desired for a particular application.

In a dc—dc buck converter, the output voltage and the input current are controlled by a pulse width modulation (pwm) having a duty cycle D, as follows:

$$V_o = DV_i \quad [1]$$

$$I_i = DI_L \quad [2]$$

where $V_o$ is the output voltage, $V_i$ is the input voltage, $I_i$ is the input current and $I_L$ is the output inductor current. This invention teaches that a similar relationship pertains to three phase buck power converters and that this relationship can be exploited for power factor correction. Throughout this specification, a reference to one or more equations with a number in brackets, [#], refers to the equations prefixed with the numerical designation, as above and continuing hereafter.

For power factor correction, it is desired that the three input currents have a sinusoidal wave shape, in phase with the three input voltages.

$$V_1 = V_p(\sin(\theta)) \quad [3]$$

$$I_1 = I_p(\sin(\theta)) \quad [4]$$

$$V_2 = V_p(\sin(\theta + 120°)) \quad [5]$$

$$I_2 = I_p(\sin(\theta + 120°)) \quad [6]$$

$$V_3 = V_p(\sin(\theta + 240°)) \quad [7]$$

$$I_3 = I_p(\sin(\theta + 240)) \quad [8]$$

where $V_1$, $V_2$ and $V_3$ are the three phase input voltages; $I_1$, $I_2$ and $I_3$ are the three phase input currents; $\theta$ is the phase angle of phase 1; and $V_p$ and $I_p$ are, respectively, the magnitude terms for the peak input voltage and the peak input current.

If a three input buck converter is arranged so that the inductor current $I_L$ is conducted by any of the three switches when it is closed, then the desired input currents are given by $$I_1 = D_1 I_L = I_P(\sin(\theta)) \quad [9]$$

$$I_2 = D_2 I_L = I_P(\sin(\theta+120°)) \quad [10]$$

$$I_3 = D_3 I_L = I_P(\sin(\theta+240°)) \quad [11]$$

where $D_1$, $D_2$ and $D_3$ are the duty cycles of the three switching functions, one for each phase. For analysis, we can consider that $$I_L \approx I_o \quad [12]$$

where $I_o$ is the output current. For one cycle of the high frequency pwm switch cycle, $I_o$ can be assumed to the constant, if the inductor is sufficiently large. Substituting into [12] into [9] through [11] and rearranging, we have $$D_1 = \frac{I_p}{I_0}\sin(\theta) \quad [13]$$

$$D_2 = \frac{I_p}{I_o}\sin(\theta+120°) \quad [14]$$

$$D_3 = \frac{I_p}{I_o}\sin(\theta+240°) \quad [15]$$

The duty cycles $D_1$, $D_2$ and $D_3$ are defined as functions of $I_p$ and $I_o$, but $I_p$ is a dependant variable. To be useful, $D_1$, $D_2$ and $D_3$ should be defined in terms of the independent variables $V_i$ and $V_o$. To do this, let us define the power relationships in the three phase power converter with power factor correction. Losses are considered to be part of the output power $P_o$ and, on average, the input power $P_i$ must equal the output power $P_o$.

$$P_o = P_i \quad [16]$$

$$P_o = V_o I_o \quad [17]$$

$$P_i = V_1 I_1 + V_2 I_2 + V_3 I_3 \quad [18]$$

Combining [3] through [8] into [18], we get $$P_i = V_p I_p(\sin^2(\theta)) + V_p I_p(\sin^2(\theta+120°)) + V_p I_p(\sin^2(\theta+240°)) \quad [19]$$

Given the identity $$\sin^2(x) = \frac{1}{2} - \frac{1}{2}\cos(2x) \quad [20]$$

the input power $P_i$ becomes $$P_i = \frac{3}{2} V_p I_p \quad [21]$$

as the cosine terms sum to zero.

Substituting [21] into [16] and combining with [17], we can say that $$\frac{3}{2} V_p I_p = V_o I_o \quad [22]$$

Solving for $I_p$, $$I_p = \frac{2}{3}\frac{V_o I_o}{V_p} \quad [23]$$

Thus the duty cycles $D_1$, $D_2$ and $D_3$ are defined as $$D_1 = \frac{2}{3}\frac{V_o}{V_p}\sin(\theta) \quad [24]$$

$$D_2 = \frac{2}{3}\frac{V_o}{V_p}\sin(\theta+120°) \quad [25]$$

$$D_3 = \frac{2}{3}\frac{V_o}{V_p}\sin(\theta+240°) \quad [26]$$

We can define a constant K such that $$K = \frac{2}{3}\frac{V_o}{V_p} \quad [27]$$

A negative duty cycle is not real, but the magnitude is correct, so the sine functions may be expressed as absolute values. Combining [27] into [24] through [26] and expressing the duty cycles as positive terms, we get $$D_1 = K|\sin(\theta)| \quad [28]$$

$$D_2 = K|\sin(\theta+120°)| \quad [29]$$

$$D_3 = K|\sin(\theta+240°)| \quad [30]$$

The term K represents a term of the open loop transfer function, and it can be modulated by feedback from the output voltage $V_o$ just as is the duty cycle D of a dc—dc buck converter to control the output voltage $V_o$. Dynamic response of such a three phase buck converter will be comparable to that of a dc-dc buck converter.

As defined in [29] through [30], K relies upon a function generator that generates the sine terms as functions of $\theta$. In practical circuits, the input voltages $V_1$, $V_2$ and $V_3$ may be used as the sine references. From [3], [5] and [7], the input voltages $V_1$, $V_2$ and $V_3$ all contain the multiplier $V_p$, so that term must be divided out in solving for $D_1$, $D_2$ and $D_3$.

$$D_1 = \frac{K}{V_p}|V_1| \quad [31]$$

$$D_2 = \frac{K}{V_p}|V_2| \quad [32]$$

$$D_3 = \frac{K}{V_p}|V_3| \quad [33]$$

For many applications, the factor K can be rescaled to account for the $V_p$ term. It does, however, show that the duty cycles $D_1$, $D_2$ and $D_3$ have a dependence on the line voltage, as would be expected. The feedback from $V_o$ can correct for this in many applications. Note, though, from [27], that K itself already has a $V_p$ term in its denominator, so the actual error due to input voltage regulation is a squared term in the denominator. Substituting [27] for K and rearranging $$D_1 = \frac{2}{3}\frac{V_o}{V_p^2}|V_1| \qquad [34]$$

$$D_2 = \frac{2}{3}\frac{V_o}{V_p^2}|V_2| \qquad [35]$$

$$D_3 = \frac{2}{3}\frac{V_o}{V_p^2}|V_3| \qquad [36]$$

Fortunately, the $V_p^2$ term in the denominator is fairly straightforward to generate and apply as feed forward, if it is desired to correct for line regulation. The input voltages can be squared and added, using [20]. The cosine terms sum to zero, leaving a constant dc voltage:

$$V_p^2 = \frac{2}{3}(V_1^2 + V_2^2 + V_3^2) \qquad [37]$$

As would be familiar to one skilled in the art of power converters, the duty cycle D of a dc—dc buck converter is often generated by the intercept of a capacitor charging ramp and a feed back error voltage. Input voltage feed forward can be used to modify the slope of the capacitor charging ramp to improve input voltage regulation. As will be seen below in the detailed description, the $V_p^2$ function can be used similarly in a three phase buck power converter.

The above describes voltage mode feed back control. This invention also teaches current mode control for a three phase buck power converter. In current mode control, the inductor current is allowed to ramp up until it reaches a current equal to a current set point, at which time the on time is ended. If the duty cycle of one phase, say $D_1$ is determined by a current set point, it is necessary to express the other duty cycles $D_2$ and $D_3$ as functions of $D_1$. [28] through [30] can be rearranged to solve for K:

$$K = \frac{D_1}{|\sin(\theta)|} \qquad [38]$$

$$K = \frac{D_2}{|\sin(\theta + 240°)|} \qquad [39]$$

$$K = \frac{D_3}{|\sin(\theta + 240°)|} \qquad [40]$$

Solving for $D_2$ and $D_3$ in terms of $D_1$:

$$D_2 = D_1\frac{|\sin(\theta + 120°)|}{|\sin(\theta)|} \qquad [41]$$

$$D_3 = D_1\frac{|\sin(\theta + 240°)|}{|\sin(\theta)|} \qquad [42]$$

It can be seen that the input voltages can be used without error for the sine terms, as the $V_p$ terms will cancel. Thus $$D_2 = D_1\frac{|V_2|}{|V_1|} \qquad [41]$$

$$D_3 = D_1\frac{|V_3|}{|V_1|} \qquad [42]$$

In a practical three phase buck power converter using current mode control, it is preferred to let the phase for which the instantaneous voltage is largest (absolute value) be the one for which the duty cycle is determined by the inductor current reaching the current set point. We can define this duty cycle as $D_{max}$. We can then generalize the duty cycles of the other two phases as $D_x$ and $D_y$. The generalized expressions then become:

$$D_{max} = f(I_L) \qquad [43]$$

$$D_x = D_{max}\left|\frac{V_x}{\max(V_1, V_2, V_3)}\right| \qquad [44]$$

$$D_y = D_{max}\left|\frac{V_y}{\max(V_1, V_2, V_3)}\right| \qquad [45]$$

This is a rather complex algorithm to implement in hardware, but it is all done at a signal level and would be straightforward using analog design techniques or as a program for a digital controller.

Examples of circuits implementing the above are described below in the detailed description.

BRIEF DESCRIPTION OF THE DRAWINGS

FIG. 3 shows a "star" connected three phase input. The neutral of the input may be carried to the dc output return with no isolation.

FIG. 4 shows a "Y" connected three phase input using positive side and negative side switches. Line side power factor correction may be implemented with a single inductor and capacitor. A "100% duty cycle" dc—dc converter may be used at the output, to provide isolation and a voltage ratio, if desired.

FIG. 7 shows a SPICE simulation of a half cycle of three phase input voltages. The pulse width modulated voltage to the inductor is shown, as is the resulting inductor current.

FIGS. 8 and 9 show portions of the curves of FIG. 7 with enlarged time scale.

DETAILED DESCRIPTION

Figure 1:
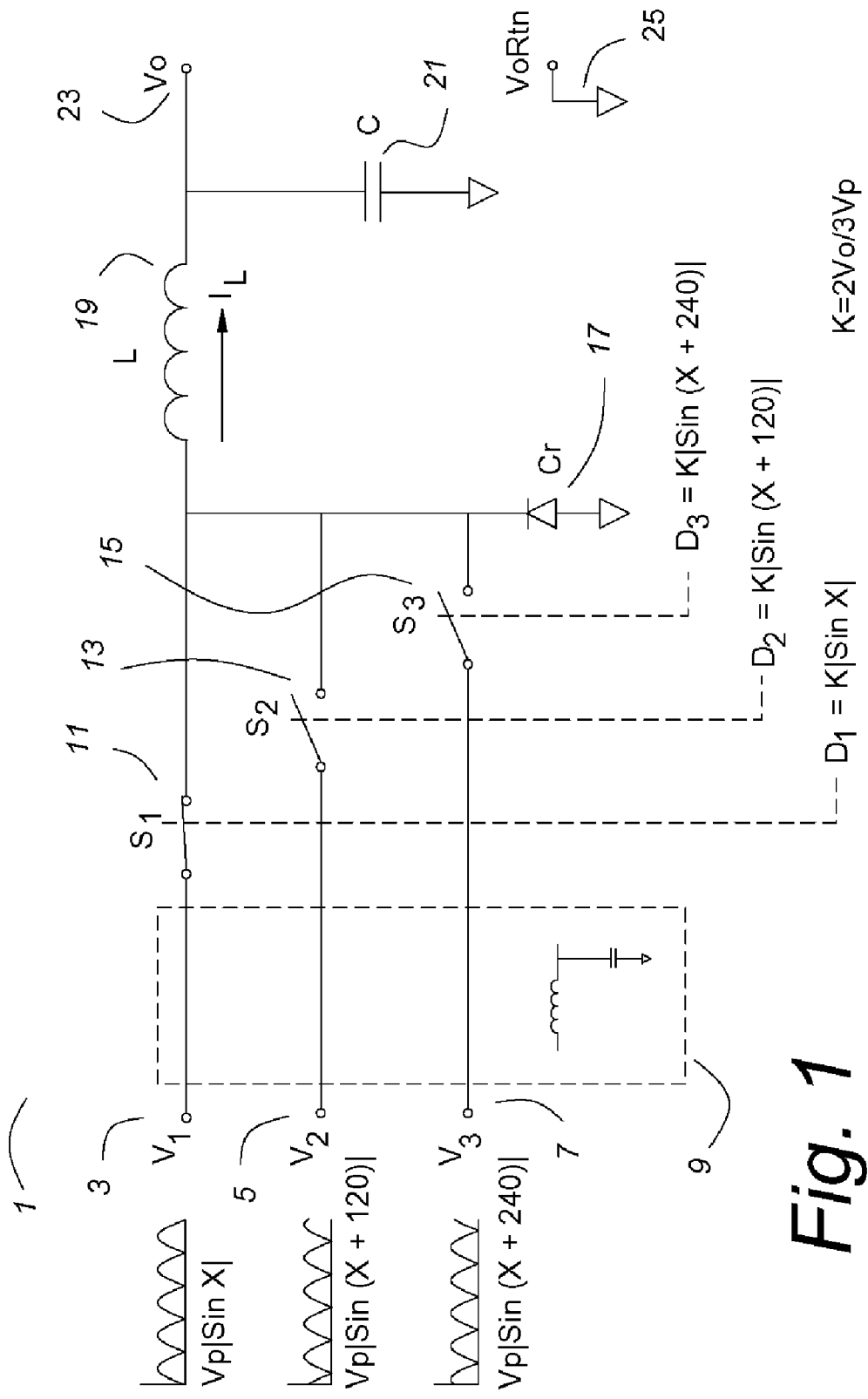
FIG. 1 shows a schematic diagram of the essential parts of the buck three phase power converter having power factor correction.

FIG. 1 shows the basic parts of a three phase buck converter 1 having power factor correction. The three input voltages V1 3, V2 5 and V3 are full wave rectified three phase sine waves having a peak magnitude Vp. An input filter 9 is shown with no detail. As with any buck inverter, the input must be filtered to prevent the high frequency current pulses from propagating, for emi (electromagnetic interference) reasons as well as to present a very low impedance to the buck converter at the pwm (pulse width modulation) frequency. The design and application of input filters is well know to one skilled in the art of power converters and could be designed and applied without undue experimentation, but would vary widely depending upon the requirements of a particular application. In this specification and the claims, any recitation of a three phase ac voltage source (or load, in the case of the boost variant) includes filtering as necessary and appropriate for a particular application. The filter is not a point of novelty, so, though it is necessary for a practical design, it is not generally shown or discussed in the specification.

Three switches S1 11, S2 13 and S3 15 pulse width modulate (pwm) the input voltages 3, 5 and 7 respectively and collectively provide a pwm voltage to an output inductor L 19. The output of the inductor L 19 is filtered by an output capacitor C 21 to produce a dc voltage output 23 having a voltage Vo with respect to the dc common ground VoRtn 25. A rectifier Cr 17 conducts the inductor current IL when all of the switches 11, 13 and 15 are open. The closure of the switches 11, 13 or 15 is mutually exclusive for this embodiment of the invention, and is defined by the duty cycles D1, D2 and D3 respectively.

The switches 11, 13 or 15, the rectifier 17, the inductor 19 and the output capacitor C 21 collectively are a three input buck converter. Usually, in a buck converter, the input voltage cannot be lower than the output voltage. However, in a three input buck converter one or more of the input voltages may be lower than the output voltage, even zero, if one of the input voltages is sufficiently higher than the output voltage. The criterion is that the average voltage on the input of the inductor must equal the output voltage. This is satisfied if, for any pwm switching cycle $$D_1V_1+D_2V_2+D_3V_3=V_o \qquad [46]$$

As shown in the analysis in the Summary of the invention above, if the duty cycles meet the criteria of equations [28] through [30], over the entire line frequency cycle of the input voltages V1, V2 and V3, The average voltage on the inductor L 19 will be equal to the output voltage Vo and the input currents will be power factor corrected.

Figure 2:
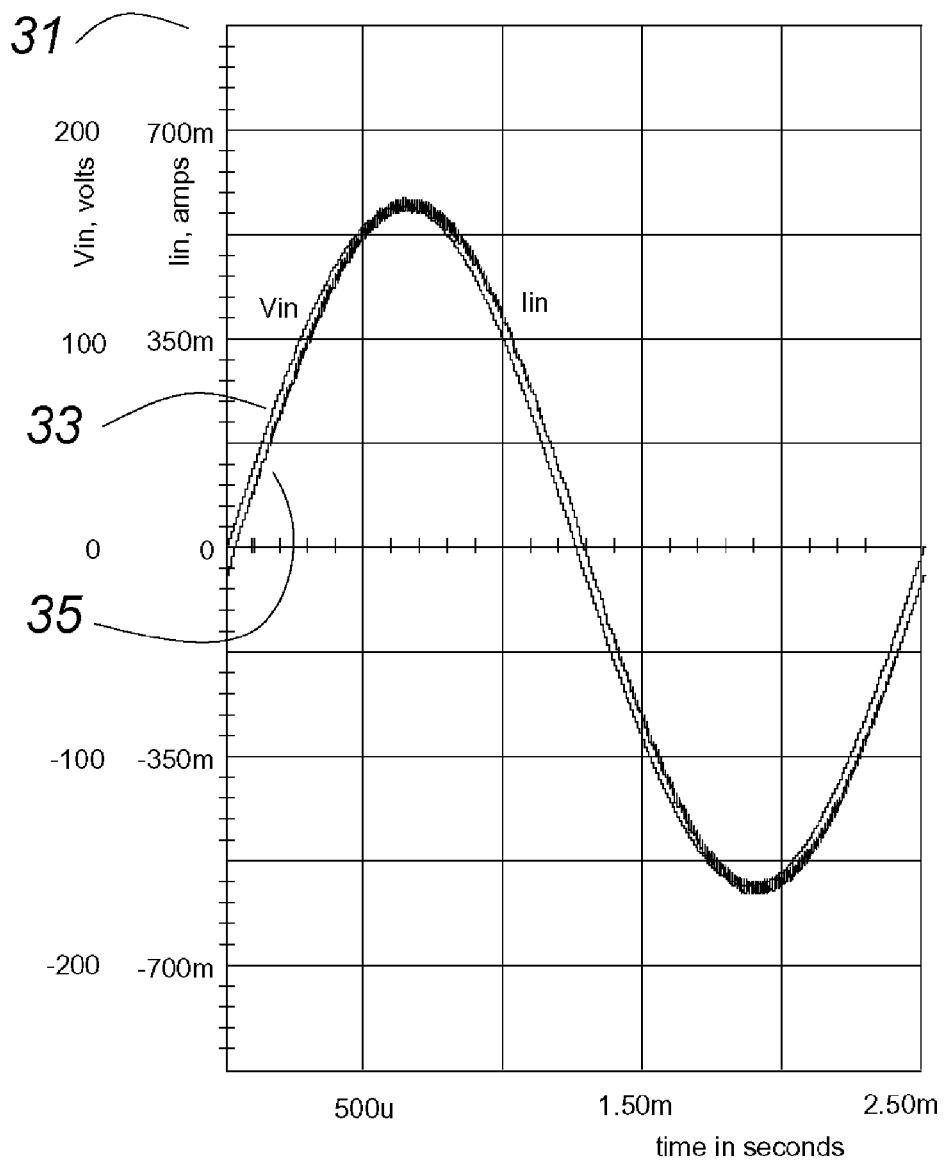
FIG. 2 shows a SPICE simulation of the input voltage and input current of one phase of the three phase buck power converter having power factor correction.

FIG. 2 shows a graph 31 of a SPICE simulation of one phase of a three phase input voltage (curve 33) and current (curve 35) for the three phase buck power converter 1 of FIG. 1. For simulation, the inductor 17 was replaced with a current source. This is reasonable, as in a practical buck power converter feedback would modulate the control so as to keep the inductor current constant for steady state conditions. The input frequency is 400 Hz, and the switching frequency is 100 kHz. This SPICE simulation is a pulse by pulse simulation, not an average state simulation. It took a very long time to run, and would not converge with input filtering, so the input current pwm waveform was filtered for the graph. This is believed to simulate the wave form that would be achieved with a practical input filter. With larger separation of the line frequency and the switching frequency lower phase shift and/or lower ripple could be achieved.

FIG. 3 shows a three phase buck converter 41 with power factor correction that is similar to the three phase buck converter 1 of FIG. 1 with a three phase star connected input 93 and push pull rectifiers 81, 83, 85, 87, 89 and 91 that rectify the input voltages B– 43, A+ 45, C– 47, B+ 49, A– 51 and C+ 53 to make three full wave rectified input voltages. (These correspond to the inputs 3, 5 and 7 of FIG. 1). The switches 61, 63 and 65 are shown as MOSFET transistors with their drivers, as an example, not a limitation. The catch rectifier 67, the inductor 69 and the output capacitor 71 complete the three input buck converter to produce an output voltage Vo 73 and its return VoRtn 75. The advantage of using the star connection 93 is that the Neutral 55 is common with the output VoRtn 75. The circuit may also have an earth ground 57.

For this specification and the claims, "switches" includes any switching device, such as a MOSFET transistor, a bipolar transistor, an IGBT, as examples, not limitations, together with their drivers (and any isolation that may be needed for the driver), to accept a logical input from a control circuit and operate the switches as necessary to implement the control function of the control circuit.

For this specification and the claims, "rectifiers" includes synchronous rectifiers and their drivers and logic. Synchronous rectifiers be may be any switching device, such as a MOSFET transistor, a bipolar transistor, an IGBT, as examples, not limitations, together with their drivers (and any isolation that may be needed for the driver), to accept a logical input from a control circuit and operate the switches as necessary to implement the rectifying function.

The three phase star connection 93 has the characteristic that the three phase buck power converter 41 can be implemented entirely without isolation and the output voltage $V_o$ 73 will be referenced to the same point as the input voltages 43, 45, 47, 49, 51 and 53. In this example, that is the neutral 57, which is common with the output return VoRtn 75. A safety or chassis ground 57 may also pass through the converter.

FIG. 4 shows a three phase buck power converter 101 connected to a three phase "Y" connected voltage input 103. The buck converter comprises an inductor 139 and an output capacitor 141. The output capacitor 141 is the output capacitor of the three phase buck converter, but further conditioning of the output voltage from the three phase buck converter in the form of an isolation transformer 143 is shown, to generate the final output voltage, Vo' 145 and its return, VoRtn' 147.

A three phase buck converter function can be implemented without isolation, but the output voltage on the filter capacitor C 141 would be plus and minus one half of $V_o$, nominally, with ripple. This may be useable for some applications, but optionally, the output may be isolated and changed in voltage level with a dc—dc converter 143 on the output. A 100% duty cycle transformer coupled dc—dc converter 143 is preferred to implement this function, to maximize efficiency and to introduce as little noise as practical. One skilled in the art of power converters would be familiar with transformer isolated dc—dc converters and would be able to apply them to this application without undue experimentation.

The three phase buck converter 101 of FIG. 4 comprises three rectifiers 111, 113 and 115, three switches 123, 125 and 127 and a catch rectifier 135 on the positive side of the neutral 149, for positive states of the input voltages A 105, B 107 and C 109 and three rectifiers 117, 119 and 121, three switches 129, 131 and 133 and a catch rectifier 137 on the negative side of the neutral 149 for negative states of the input voltages A 105, B 107 and C 109. One either side, the switch closure is mutually exclusive but it is preferred to maximize the overlap of a positive switch closure with a negative switch closure to the extent possible. If one carefully inspects the three phase voltage relationship, it can be seen at any time that one phase has the maximum absolute value instantaneously, both of the other phases are of the opposite polarity. This can be an advantage when implementing current mode control in accordance with equations [43] through [45]. For the purpose of defining a dc output voltage Vo for use in generating the timing for the switches 123, 125, 127, 129, 131 and 133, the dc output voltage 151 at the capacitor 141 with respect to the common dc return 153 should be used. However, the switch timing may be modulated by a means for feedback control from the final dc output Vo' 145 to precisely control the final output voltage Vo' 145

Figure 21:
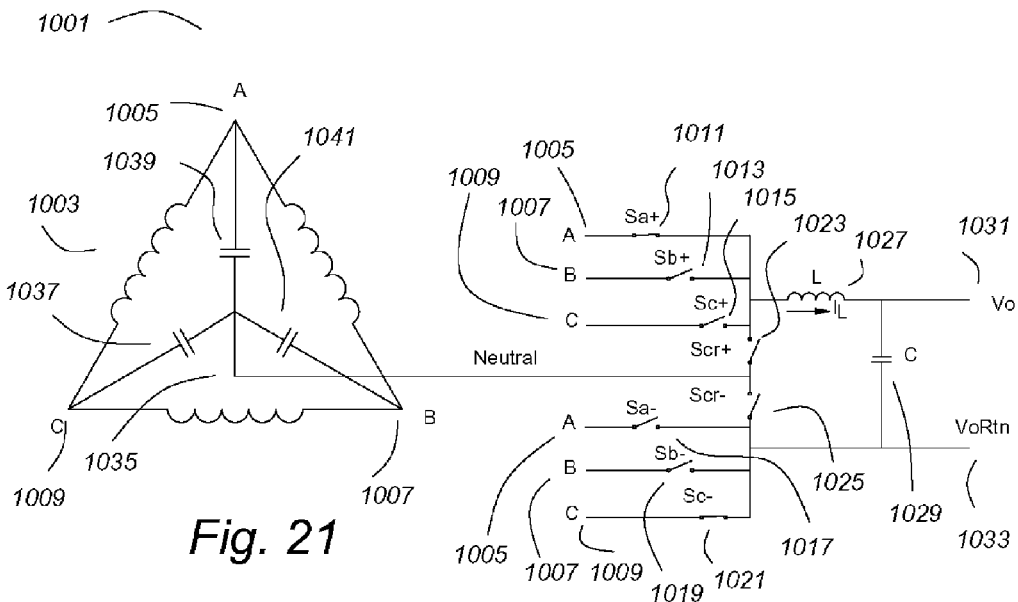
FIGS. 21–23 shows a three-phase buck converter.

Although a "Y" connected input 103 is shown, as an alternative, a Δ connection may be used with "Y" connected capacitors on the inputs to conduct switching frequency ac ripple currents, see FIG. 21. Because buck converters have pwm currents on their input, filtering is almost always necessary, and these capacitors may be part of such a filtering network.

Figure 5:
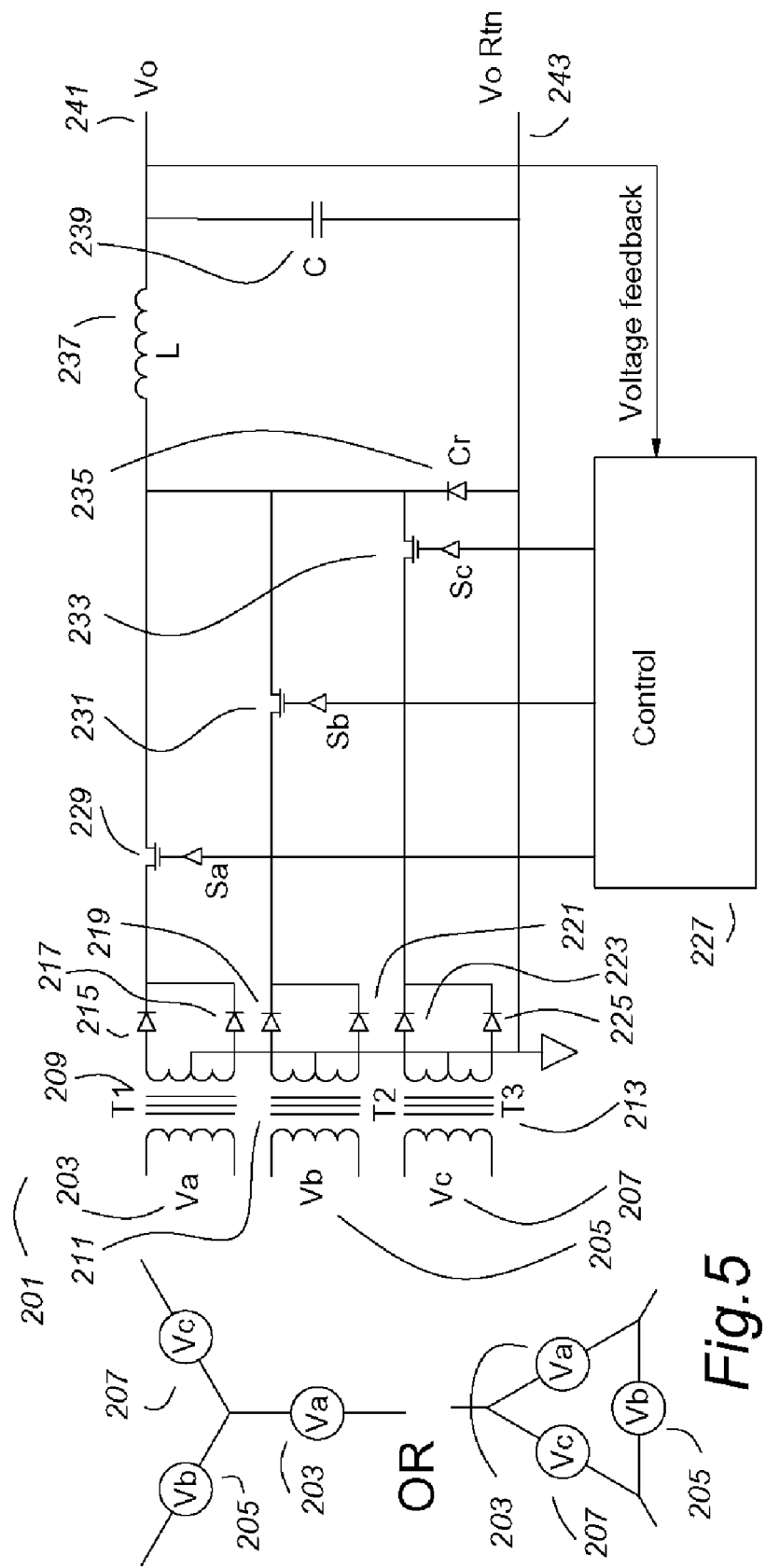
FIG. 5 shows a "delta", or alternatively, a "Y" three phase input to a three phase buck power converter with transformer isolation on the input. The transformers may be "100% duty cycle" high frequency dc—dc converters, and may have a voltage ratio.

FIG. 5 shows a three phase buck converter 201 with power factor correction having transformer isolation on its inputs. The three phase sine wave input voltages Va 203, Vb 205 and Vc 207 may be Y connected or Δ connected as shown in the two diagrams at the left. The secondary connections of the transformers 205, 211 and 213 will be recognized as a star connection, and the secondary output are rectified by rectifiers 215, 217, 219, 221, 223 and 225, just as in FIG. 1. The transformers 209, 211 and 213 could be line frequency transformers, but it is contemplated that they could also be high frequency converters operating at 100% duty cycle. A control circuit 227 is shown to control the duty cycle and drive three switches 229, 231 and 233 (shown as MOSFETs, as an example, not a limitation). The output voltage $V_o$ 241 is fed back to the control 227 to precisely control the output voltage Vo 241 in accordance with the equations in the Summary of the Invention, above. A catch rectifier 235, an inductor 237 and an output capacitor 239 complete the circuit of the three input buck converter, just as in FIG. 1. The output voltage Vo 241 has a return VoRtn 243.

Figure 6:
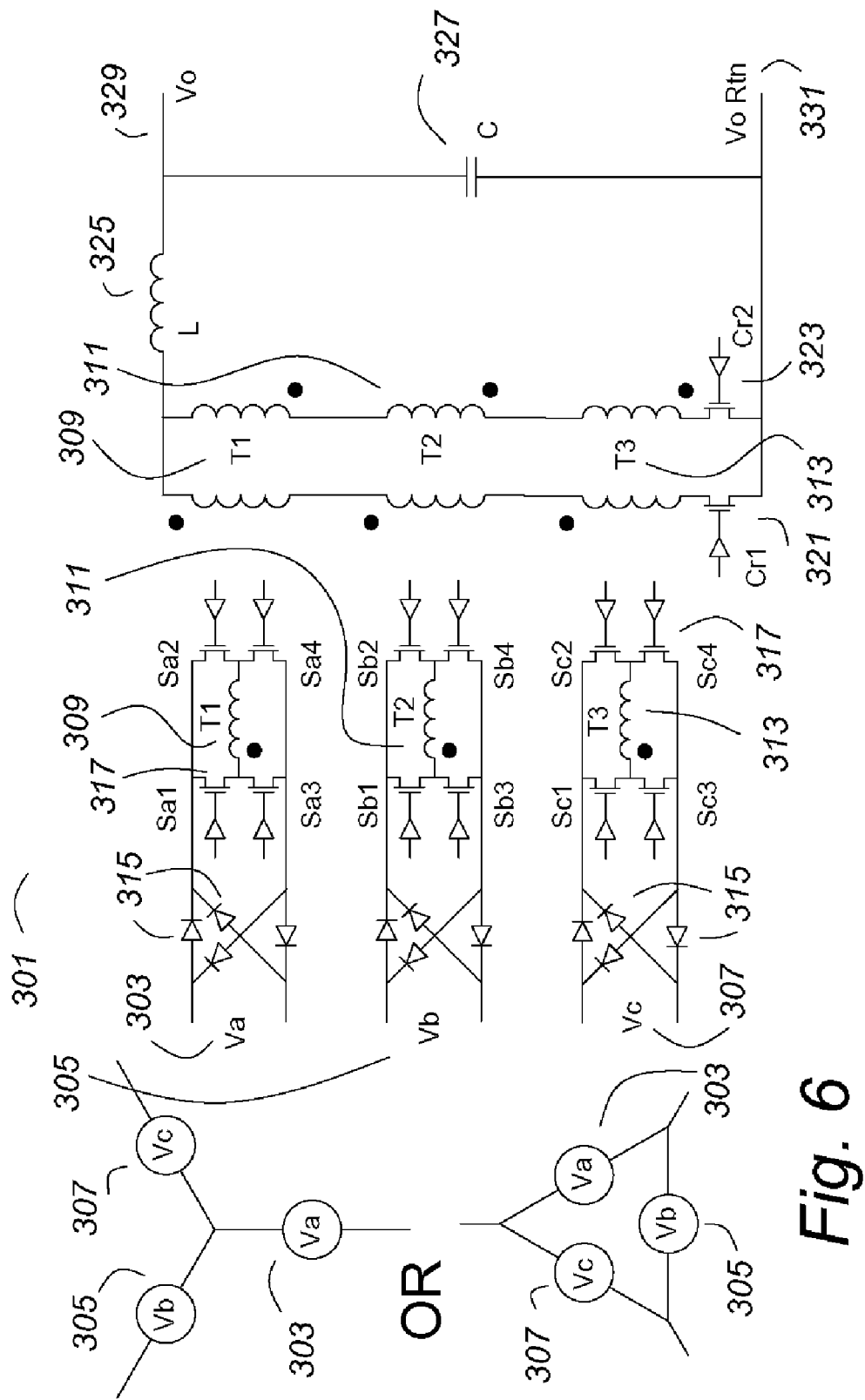
FIG. 6 shows a "delta", or alternatively, a "Y" three phase input to a three phase buck power converter having power factor correction. The three voltages of the three phase input are each full wave rectified, then pulse width modulated with three phase-shifting full bridge converters each of which excites one of three series connected transformers. The series connected push-pull rectified secondary windings provide a voltage to an inductor and a capacitor.

FIG. 6 shows a three phase buck converter 301 having power factor correction that may be operated from a "Y" or a Δ connection, as represented by the alternate input connections shown on the left of the figure. Each of the inputs Va 303, Vb 305 and Vc 307 input is full wave rectified by 12 rectifiers 315–315, then pulse width modulated with a phase-shifting full-bridge switches 317–317 to drive the primary windings of three transformers $T_1$ 309, $T_2$ 311 and $T_3$ 313. The secondary windings of the transformers $T_1$ 309, $T_2$ 311 and $T_3$ 313 are wired in series and full wave rectified by synchronous rectifiers 321 and 323. The switches 317—317 and the synchronous rectifiers 321 and 323 are shown as MOSFETs with their drivers, as an example, not a limitation. An inductor L 325 and an output capacitor C 327 complete the three input buck converter. The voltage across the output capacitor C 327 is the output voltage Vo 329 and the output voltage return VoRtn 331. It is understood that there is a control circuit, not shown, to correctly operate the phase-shifting full-bridge switches 317—317. One skilled in the art of power converters would understand phase-shifted full-bridge circuits, and in particular, phase shifted full-bridge circuits used as primary circuits for transformers. He would understand the necessary timing relationships for the secondary synchronous rectifiers and would be able to use phase-shifted full-bridge primary circuits and secondary synchronous rectifiers for this invention without undue experimentation.

There are strict criteria on the timing of the switches 317—317 and the synchronous rectifiers 321 and 323, but it is a restriction that is not difficult to implement in a practical control circuit. The criteria is that all switches that are in an "on" state must induce the same polarity voltage in the secondary windings, and all witching means that are in an "off" state must present a short circuit to the secondary windings. A phase-shifting full wave bridge meets these criteria. A push-pull or half bridge drive may be modified to meet the criteria as well, by providing a shorting means across the primary winding of the transformer during the off state. There is no limitation on the simultaneity of the switching pulses. To maximize efficiency, it is preferred that the duty cycles be as high as practical.

FIGS. 7 through 9 show graphs 401, 401a and 401b of a SPICE simulation showing the full wave rectified three phase voltage inputs Va 403, Vb 405 and Vc 407, the pulse width modulated inductor input voltage $V_L$ 409 and the inductor current $I_L$ 411 for a three phase buck power converter with power factor correction such as the three phase buck converter 1 of FIG. 1. FIG. 7 shows a pulse-by-pulse SPICE simulation over one half of a 1000 Hz line frequency cycle. FIGS. 8 and 9 show portions 401a and 401b of the graph 401 of FIG. 7 with an expanded scale, as indicated by the dashed boxes designated 401a and 401b respectively in FIG. 7. The pwm switching frequency is 100 kHz. In the figures, like reference designators signify like items. In the case of these three FIGS. 7, 8 and 9, like reference designators indicate the same signals in the SPICE simulated oscillographs, though with different time scales.

In FIGS. 8 and 9 it can be seen clearly that the input voltage 409 on the inductor comprises three pulses 413, 415 and 415 in sequence for each pwm switching cycle. The height and the width of the pulses are sine functions (absolute value), the height being a characteristic of the instantaneous input voltage for each phase, and the width being a function of the control circuit timing, implementing equations [28] through [30]. Also in FIGS. 8 and 9 it can be seen clearly that the inductor current 411 has differing slopes corresponding to the differing levels of the voltage 409 on the input of the inductor. When the inductor voltage 409 is at its maximum 413, the slope 419 of the inductor current 411 is also at its maximum positive value. During the second pulse 415 of the inductor voltage 409, the slope 421 is reduced, as the voltage 409 is reduced at that time. During the third pulse 417 of the inductor voltage 409, the slope 423 is nearly flat, because the magnitude of the inductor voltage 409 is approximately equal to the output voltage (not shown). Following the three pulses 413, 415 and 417, the inductor voltage 409 is zero, and the slope 425 of the inductor current 411 is steeply negative. When the amplitude of the inductor voltage is reduced but greater than zero, for example, pulse 427, the slope 427 of the inductor current 411 is negative, but not as steeply so as the slope 425.

FIG. 9 shows a similar relationship between the inductor voltage 409 and the inductor current 411, with differences because it is taken at a different time slot when the input voltages Va 403, Vb 405 and Vc 407 have different relative magnitudes.

Figures 10, 11:
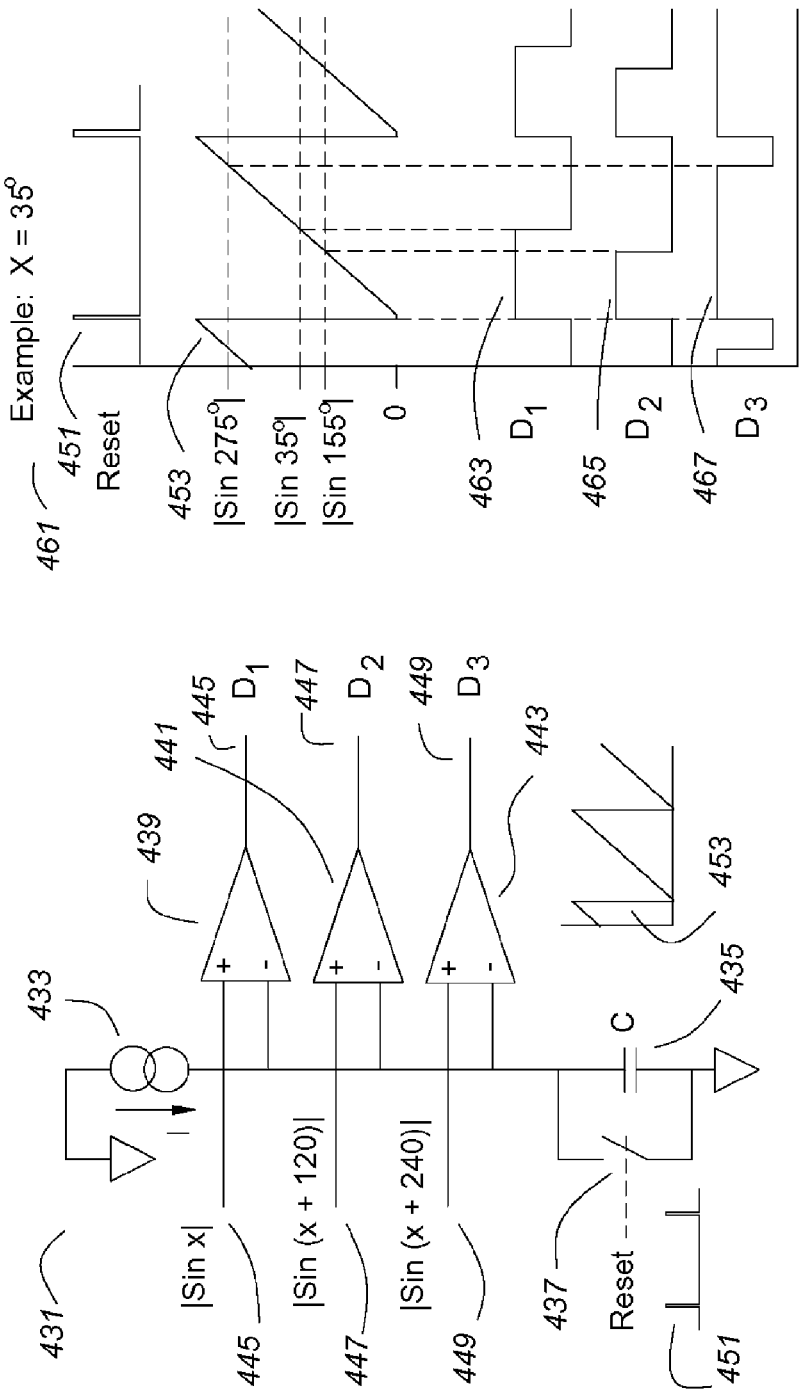
FIG. 10 shows a schematic diagram of the essential parts of a control for three phase power factor correction. The current I may be modulated under feedback control to control the output voltage of a three phase buck power converter.
FIG. 11 shows the important wave forms for the control circuit of FIG. 10.

FIG. 10 shows a very basic control circuit 431 to introduce the control concept. The output pulses of this control circuit are shown in FIG. 11, and would be suitable for controlling the three phase buck converter 301 with power factor correction of FIG. 6.

A charging current I from a current source 433 charges a capacitor C 435 at a steady rate which is a function of the current I and the size of the capacitor C 435, as would be well understood by one skilled in the art of power converter control. Periodically, a reset pulse closes a switch 437 to discharge the capacitor C 435 and start a new switching cycle. The timing of the reset pulse is shown conceptually by the graph 451 in FIGS. 10 and 11, with the positive going pulse turning the switch 437 "on". The timing of the ramp voltage of the capacitor 435 when charged with a constant current I and periodically reset by closing the switch 437 is shown conceptually by graphs 453 in FIGS. 10 and 11. In FIG. 11, the graph 453 is shown intercepting dashed lines representing the hypothetical voltage levels of the three inputs 445, 447 and 449 of FIG. 10 for an example of x=35° (where x is the phase angle of the input 445 of FIG. 10).

Three comparators 439, 441 and 443 generate the outputs $D_1$ 445, $D_2$ 447 and $D_3$ 449, and the timing of the pulses $D_1$, $D_2$ and $D_3$ are shown by curves $D_1$ 463, $D_2$ 465 and $D_3$ 467 in the graph 461 of FIG. 11. The outputs of the comparators 445, 447 and 49 are, respectively, the sine functions of equations [28] through [30]. Except for the instant that a sine function goes to zero, each comparator will be on initially, right after the reset pulse. In time, the ramp voltage of the capacitor 435 will rise to equal one or another of the sine function inputs, and at that instant, the corresponding D pulse will end. FIG. 11 shows the pulses $D_1$ 463, $D_2$ 465 and $D_3$ 467 for the example of a phase angle X equal to 35 degrees. Note that phase 3 (input 449 of FIG. 10) is near its maximum, which results in the longest duty cycle $D_3$ 467 in FIG. 11. The current I of the current source 433 may be modulated by means for feedback control to regulate the output voltage. By modulating the current I of the current source 433, the charging rate of the capacitor 435 is changed, which in turn changes the ramp voltage so that the voltage intercept occurs sooner or later, thereby modulating the duty cycles $D_1$, $D_2$ and $D_3$, and modulating the currents of all of the phases, proportionately.

Figure 12:
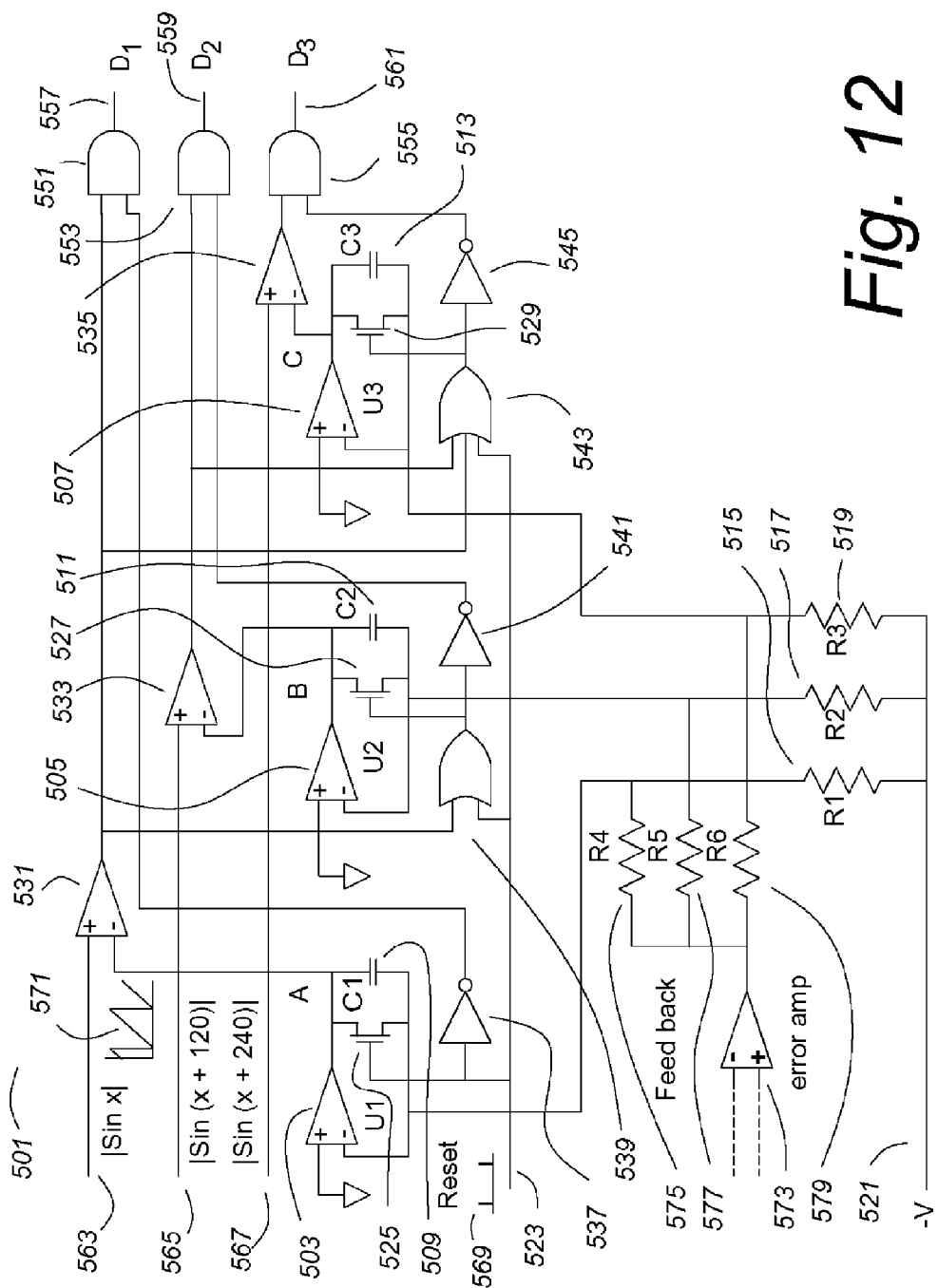
FIG. 12 shows a schematic of a control circuit for a three phase buck power converter having power factor correction having sequential pulses. A node for feedback modulation is also shown.

FIG. 12 shows a schematic diagram of a control circuit 501 which would be suitable for the control of a three phase buck power converter with power factor correction which required sequential, mutually exclusive on times, such as the converters of FIGS. 1, 3 and 5. Note that there are three operational amplifiers, U1 503, U2 505 and U3 507. Each has its positive (non-inverting) input at ground and its output feeds back through capacitors C1 509, C2 511 and C3 513, respectively, to the negative (inverting) inputs of operational amplifiers, U1 503, U2 505 and U3 507 respectively. The negative inputs of operational amplifiers, U1 503, U2 505 and U3 507 respectively are then connected through resistors R1 515, R2 517 and R3 519, respectively, to a negative voltage −V 521, a classical integrator circuit which would be familiar to one skilled in the art of analog circuit design. Unrestrained, such an integrator would charge its respective capacitors C1 509, C2 511 and C3 513 at constant slope until it saturated. A reset input 523 having a periodic reset pulse shown conceptually by a graph 569 turns on switches 525, 527 and 529 (shown as MOSFETs, as an example, not a limitation), to discharge the capacitors C1 509, C2 511 and C3 513 so that the charging slope is reset and a periodic saw tooth wave form results, as shown conceptually by a graph 571 for the example of the capacitor C1 509. The frequency of the reset determines the pwm switching frequency of the control 501.

Note first the operational amplifier U1 503. Its output is taken to a comparator 531 and compared to the voltage on input 563, which is a full wave rectified sine wave given by the function |sin x|, and which may be derived from the voltage of phase 1. When the ramp voltage on the capacitor C1 509 rises to a voltage which is greater than |sin x|, the voltage of the input 563, the comparator 531 switches low and terminates a first output D1 557. D1 is also held low during the reset pulse, as it is logically "anded" with that function (inverted by an inverter 537) by an and gate 551.

Note now the operational amplifier U2 505, and in particular, its reset switch 527. The charging capacitor C2 511 is held low during the reset pulse or during the first duty cycle D1, as the logic of D1 and the reset pulse are combined in the or gate 539. Thus its charging ramp does not begin to rise until after D1 has gone low. The output of the comparator 505 will be high until the charging ramp reaches a voltage equal to the input voltage on the input 565, |sin(x+120°)°, but the output D2 559 is held low during the reset and while D1 is high by an and gate 553. The output of the or gate 539 is inverted by an inverter 541 for that function. Similarly, the third charging ramp voltage on the capacitor C3 513 is held low until the end of D2 by the output of an or gate 543 and the switch 529. The output of the comparator 535 will be high until the ramp voltage on the capacitor C3 513 equals the voltage of the input 567 |Sin(x+240°)|, but the output D3 561 is held low during reset and while either D1 or D2 is high by the and gate 555 combined with the output of the or gate 543 inverted by the inverter 545.

Note that a feed back error amplifier 573 may feed an error signal into the three integrators through the resistors R4 575, R5 577 and R6 579. If there is no error, the output of the error amplifier is zero and the slope of the charging ramp on the capacitors C1 509, C2 511 and C3 513 is unchanged. If the output voltage is too high, the amplifier output goes low, to increase the slope of the charging ramp and shorten the duty cycles D1, D2 and D3 in equal proportion. The operation of the integrators and the feedback amplifier as well as their incorporation into a feedback control would be well understood by one skilled in the art of analog design, and it could be used with this invention without undue experimentation.

Figure 13:
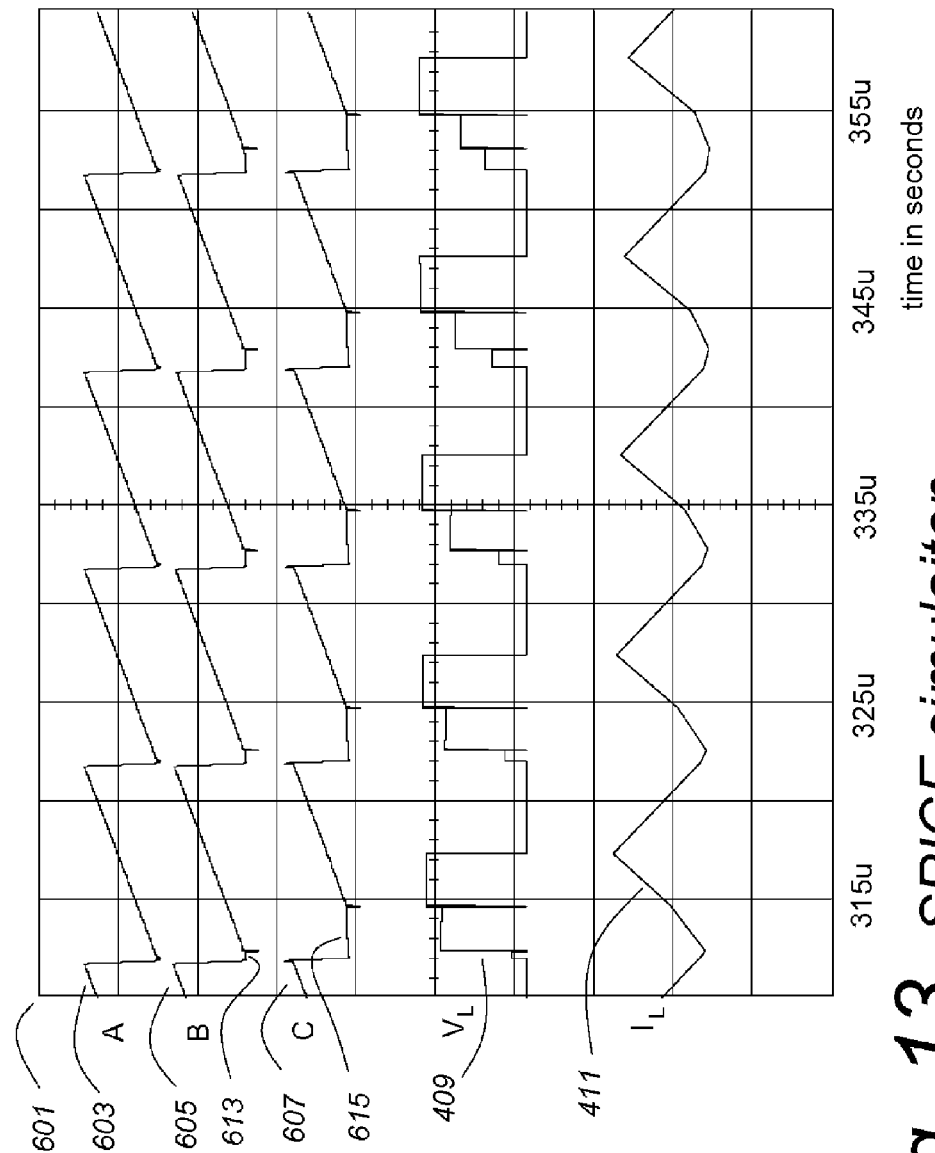
FIG. 13 shows a SPICE simulation of the important wave forms of the control circuit of FIG. 12 with a power converter such as the power converter of FIG. 1, 3 or 5.

FIG. 13 shows a graph 601 of a SPICE simulation of buck power converter with power factor correction that may use a control circuit similar to the control circuit 501 of FIG. 12. This graph is from the same SPICE simulation as FIG. 9 except that some different traces are shown, The input voltage $V_L$ 409 and the inductor current $I_L$ are the same as in FIG. 9. FIG. 9 may be referred to, to see what the input voltages Va, Vb ad Vc are doing. This graph 601 of FIG. 13 and the discussion of FIGS. 7, 8 and 9 provides the basis for understanding FIG. 13 and the application of the control circuit 501 of figure 12 to a buck power converter having power factor correction. The traces 603, 605 and 607, respectively designated by the letters A, B and C, correspond to voltages at the similarly designated points in FIG. 12. They show the charging ramps of the capacitors C1 509, C2 511 and C3 513, respectively, of FIG. 12. It can be seen that the charging voltage of the capacitor C2 511 (point B) is held low during the reset and during D1, shown in the trace 605 during the interval designated 613 on the graph 601 of FIG. 13, and that the charging voltage of the capacitor C3 513 (point C) is held low during the reset and during D1 and D2, shown in the trace 607 during the interval designated 615 on the graph 601 of FIG. 13.

Figure 14:
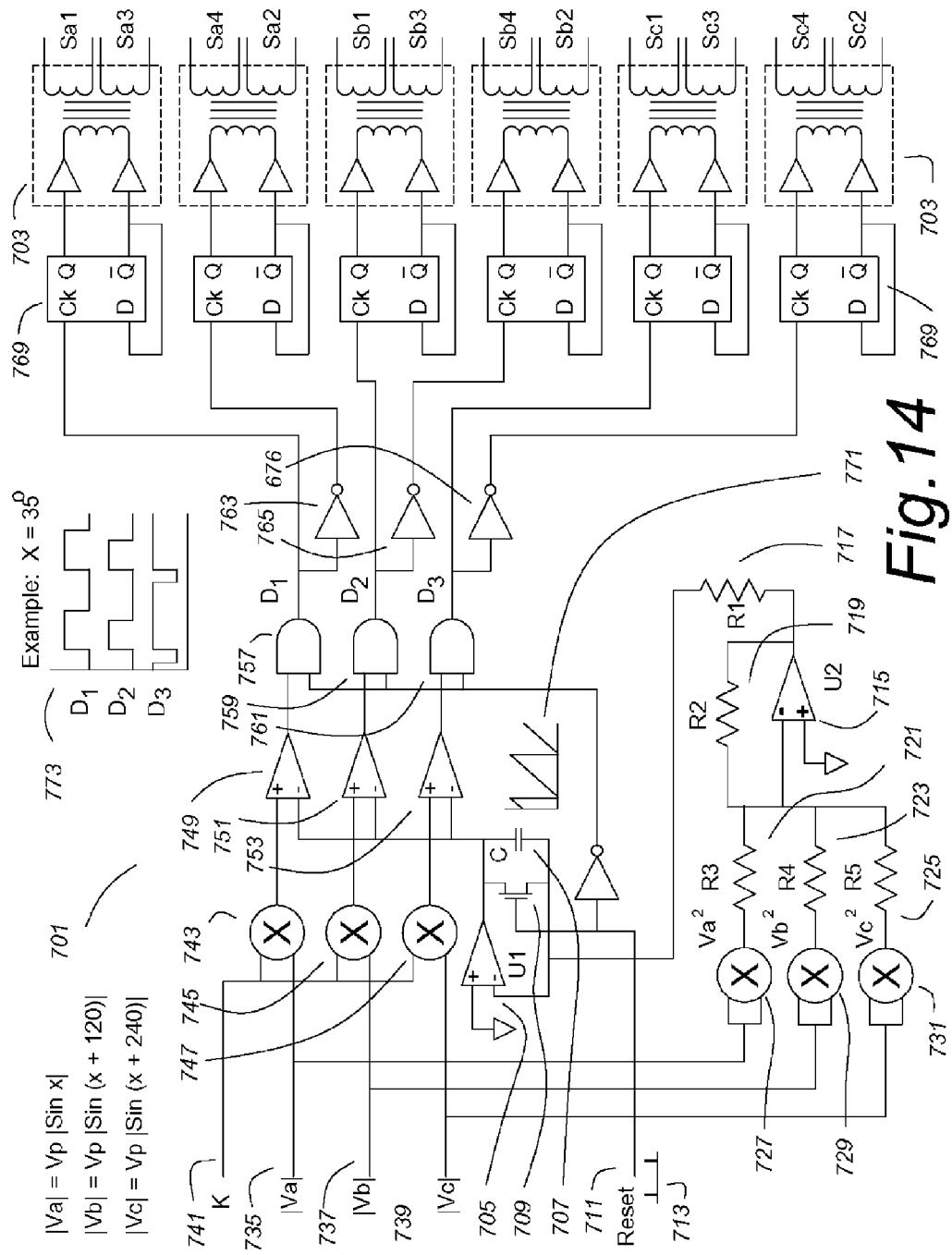
FIG. 14 shows a schematic diagram of a control circuit like the control circuit of FIG. 10 with an operational amplifier as a current source for charging the capacitor to generate a ramp. A compensation circuit for input voltage regulation is shown as well as a more sophisticated voltage control input "N". N may be adjusted from zero to a maximum value to adjust the nominal output voltage $V_o$, and it may be modulated by feedback to control the output voltage $V_o$ precisely.

FIG. 14 shows a control circuit 701 that would be suitable for controlling the three phase buck power converter with power factor correction of FIG. 6. The switches Sa1 through Sc4 317—317 of FIG. 6 may be MOSFETs, as an example, not a limitation, and they may be driven by transformer isolated gate drives 703—703. The outputs of the gate drive isolation transformers may drive the gates directly, or they may operate at a logic level to drive buffer drivers, as examples, not limitations. The use, design and application of isolated gate drives would be well known by one skilled in the art of power converter design, and could be used with this invention without undue experimentation.

As in FIG. 12, an operational amplifier U1 705 is configured as an integrator and provides a charging voltage reference as the voltage on a capacitor C 707. The voltage on the capacitor C 707 is reset periodically by a switch 709, shown as a MOSFET as an example, not a limitation. The switch 709 is operated by a signal on a reset input 711 and shown conceptually on a graph 713. A graph 771 shows a conceptual representation of the charging voltage reference. The slope of the charging voltage on the capacitor C 707 is controlled by a second operational amplifier U2 715 through a resistor R1 717.

The second amplifier 715 is part of a summing network comprising a feedback resistor R2 719 and three summing resistors R3 721, R4 723 and R5 725. The inputs to the three summing resistors R3 721, R4 723 and R5 725 are, respectively, the outputs of three multipliers 727, 729 and 731. The inputs to the three multipliers 727, 729 and 721 are, respectively the voltage inputs |Va|735, |Vb| 737 and |Vc| 739. These inputs are the full wave rectified three phase input voltages, and they may be isolated and referenced to a common ground N 733. One skilled in the art of power converters would know how to rectify and isolate these signals wile maintaining the necessary precision without undue experimentation, and the details of such a circuit are not a point of novelty of this invention. The three input voltages are each multiplied by itself by the three multipliers 727, 729, and 721, respectively, to provide three product signals $Va^2$, $Vb^2$ and $Vc^2$, which are summed in the summing network to produce the sum of the squares as the output of the second amplifier 715. Accordingly, the output of the second amplifier 715 is a negative voltage with a magnitude equal to the sum of the squares of the input voltages. With proper scaling, as would be well known by one skilled in the art of analog design, this implements equation [37], and provides precise feed forward compensation for changes in the input line voltages Va, Vb and Vc.

As in FIG. 12, an error voltage feed back could be introduced into this same node, but an alternative embodiment is shown in FIG. 14. A gain function input K is used as a multiplier function operating on the input voltages |Va| 735, |Vb| 737 and |Vc| 739 in three multipliers 743, 745 and 747 respectively. It can be seen that this gain function K will change the trip points of three comparator 749, 751 and 753 respectively, shortening or lengthening the duty cycle signals D1, D2 and D3 proportionately. Note that the outputs of the three comparators 749, 751 and 753 are anded with the reset input 711 (inverted by an inverter 755) in three and gates, 757, 759 and 761 respectively, so that the respective duty cycle signals D1, D2 and D3 are held low during reset. In this manner, the open loop output voltage of the power converter can be varied from zero to full scale, making it the preferred method of control for a power converter with an output voltage which is adjustable over a wide range. An error feed back signal may be summed into the gain function K, for precise feed back control, as would be understood by one skilled in the art of power converters. A graph 773 shows a conceptual representation of the duty cycle functions D1, D2 and D3 with respect to time for the example of a phase angle x of 35° on phase A. This logic implements equations [28] through [30].

Three inverters 763, 765 and 767 and six flip-flops 769—769 are shown to provide logic to the six isolated gate drives 703—703 as an example, not a limitation, to provide a suitable phase-shifted full bridge drive for the power converter of FIG. 6. This is a partial schematic to show the basic concept only. A practical circuit will need additional logic to ensure correct phasing for the full bridge drives and the synchronous rectifiers as well as all the "bells and whistles" usually found in power converters such as current limit, over voltage shut-down, soft start and so forth, as examples, not limitations. The control of this circuit by varying K is directly analogous to the control of a dc—dc buck converter by controlling its duty cycle, and one skilled in the art of dc—dc buck power converters will be able to apply that knowledge to control circuit designs using the present invention without undue experimentation.

Figure 15:
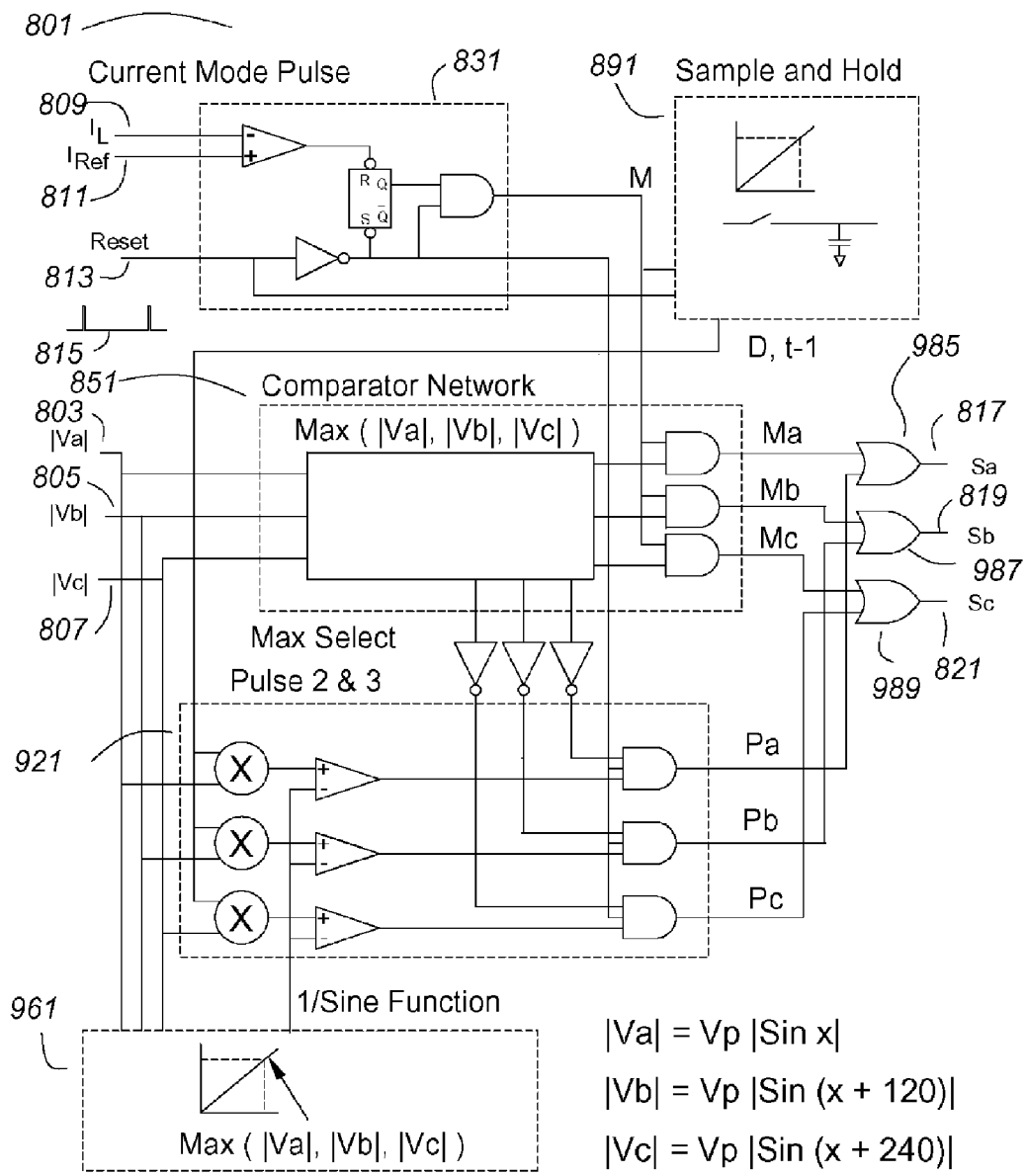
FIG. 15 shows a block diagram of a current mode control for three phase buck power converter having power factor correction.
Figure 16:
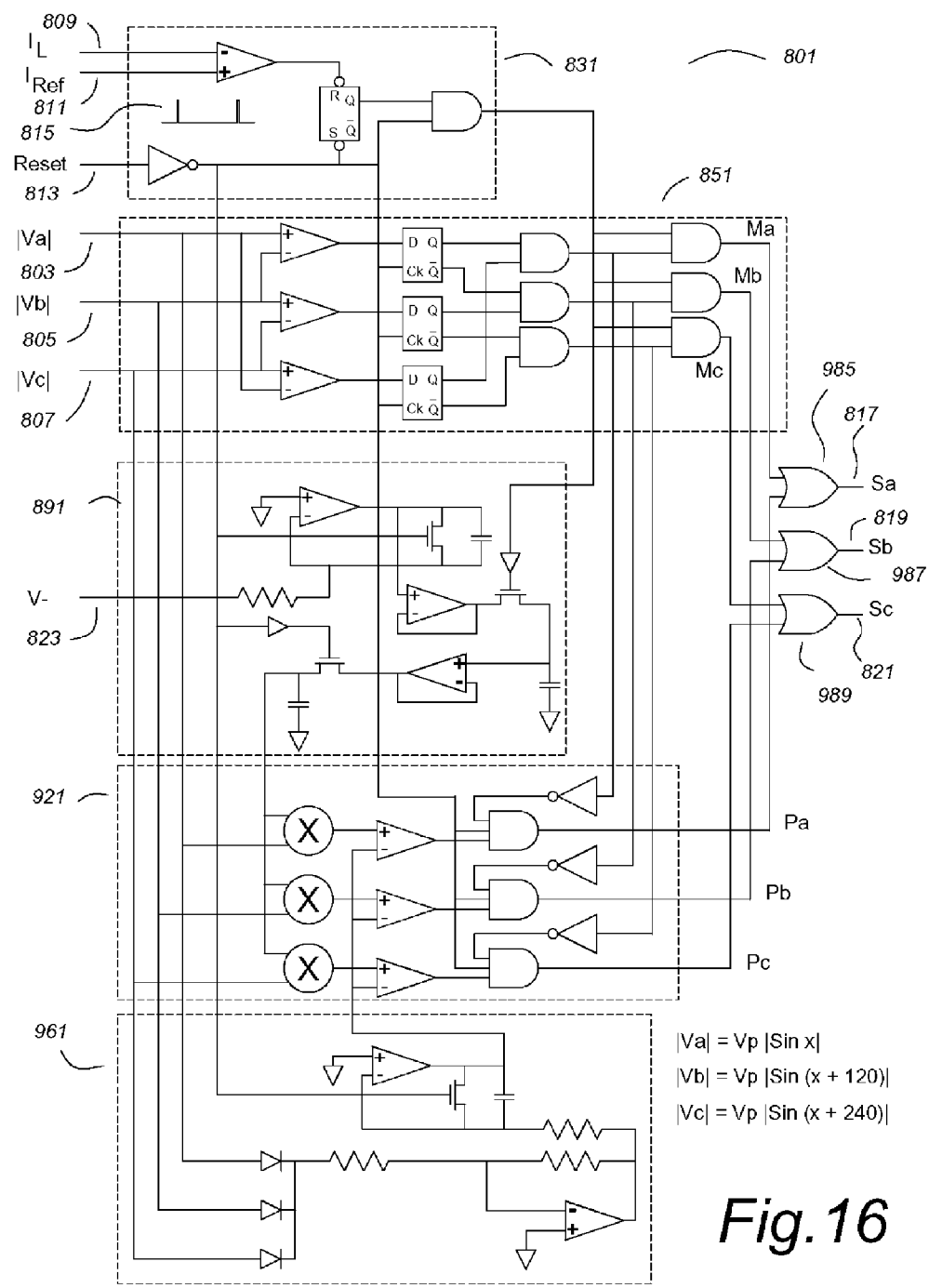
FIG. 16 shows a possible schematic of the control of FIG. 15.

The control circuits of the above discussion are voltage mode controllers. FIG. 15 shows a block diagram of a current mode controller 801 for a three phase buck converter with power factor correction, and implements equations [43] through [45]. FIG. 16 shows the same current mode controller 801 more fully implemented with digital and analog components. FIGS. 17 through 20 show smaller blocks of the schematic of FIG. 16. This discussion applies to FIGS. 15 through 20. In the figures, like reference designators refer to the same item. Many components are not identified with reference designators in FIGS. 15 and 16 because the figures are crowded, but they are identified in FIGS. 17 through 20.

As in a prior art dc—dc buck converter, a current mode pulse generator circuit 831 (shown in FIG. 16 and more particularly in FIG. 17) provides an internal signal M 841 which is high until the inductor current input $I_L$ 809 reaches the level of a current reference input $I_{ref}$ 811 at which time the output of a comparator 833 goes lot, resetting a flip-flop 835, causing the internal signal M 841 to go low until the next switching cycle, as determined by a reset input 813. The reset input 813 goes high periodically as shown conceptually in a graph 815. When the reset input goes high, it is inverted by an inverter 839 and sets the flip-flop 835 and also keeps the internal signal M 841 low, as the inverted reset pulse is anded with the Q output of the flip-flop 835 by an and gate 837.

Figure 17:
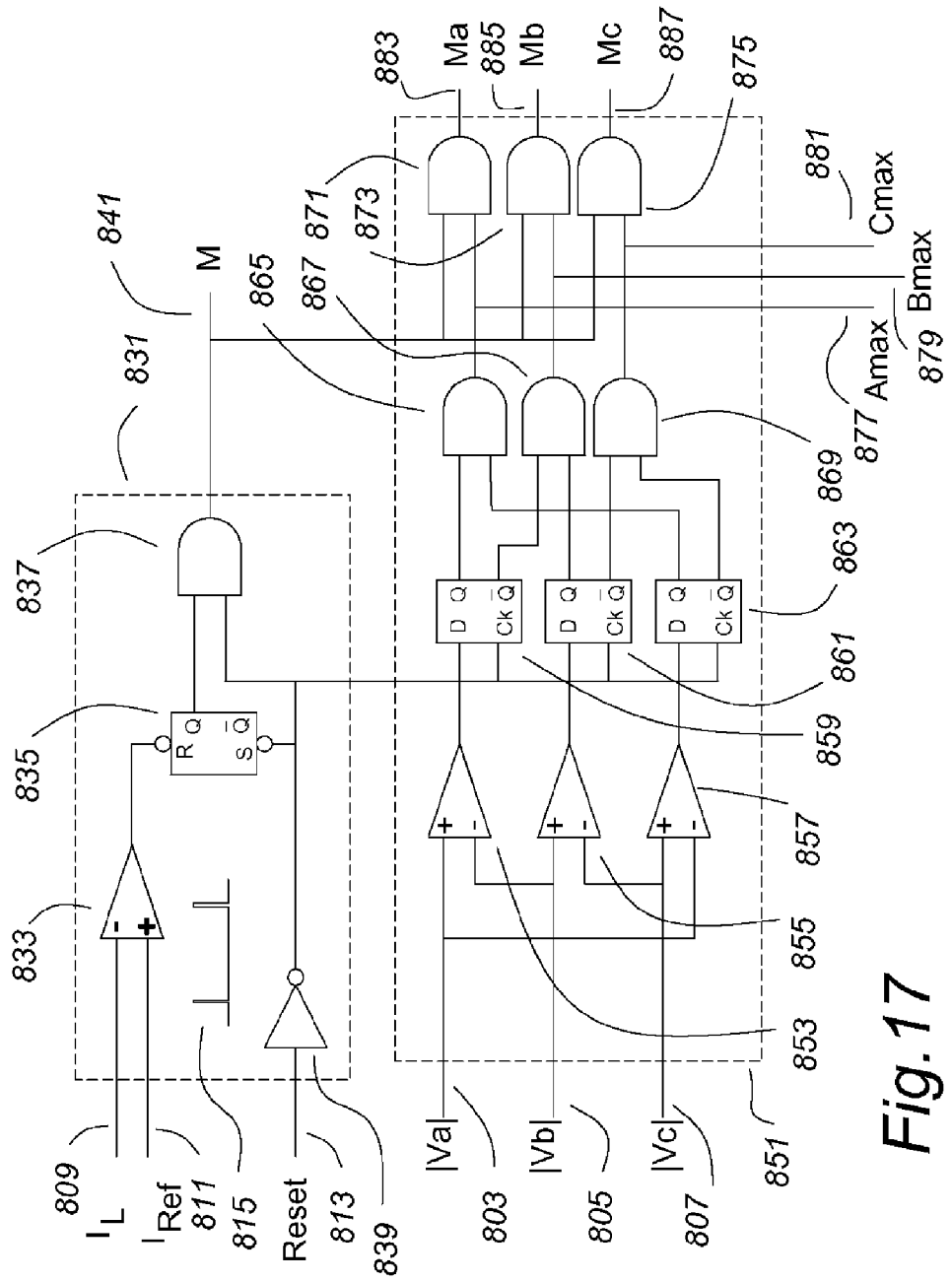
FIGS. 17 through 20 show enlarged portions of the schematic of FIG. 16.
Figure 18:
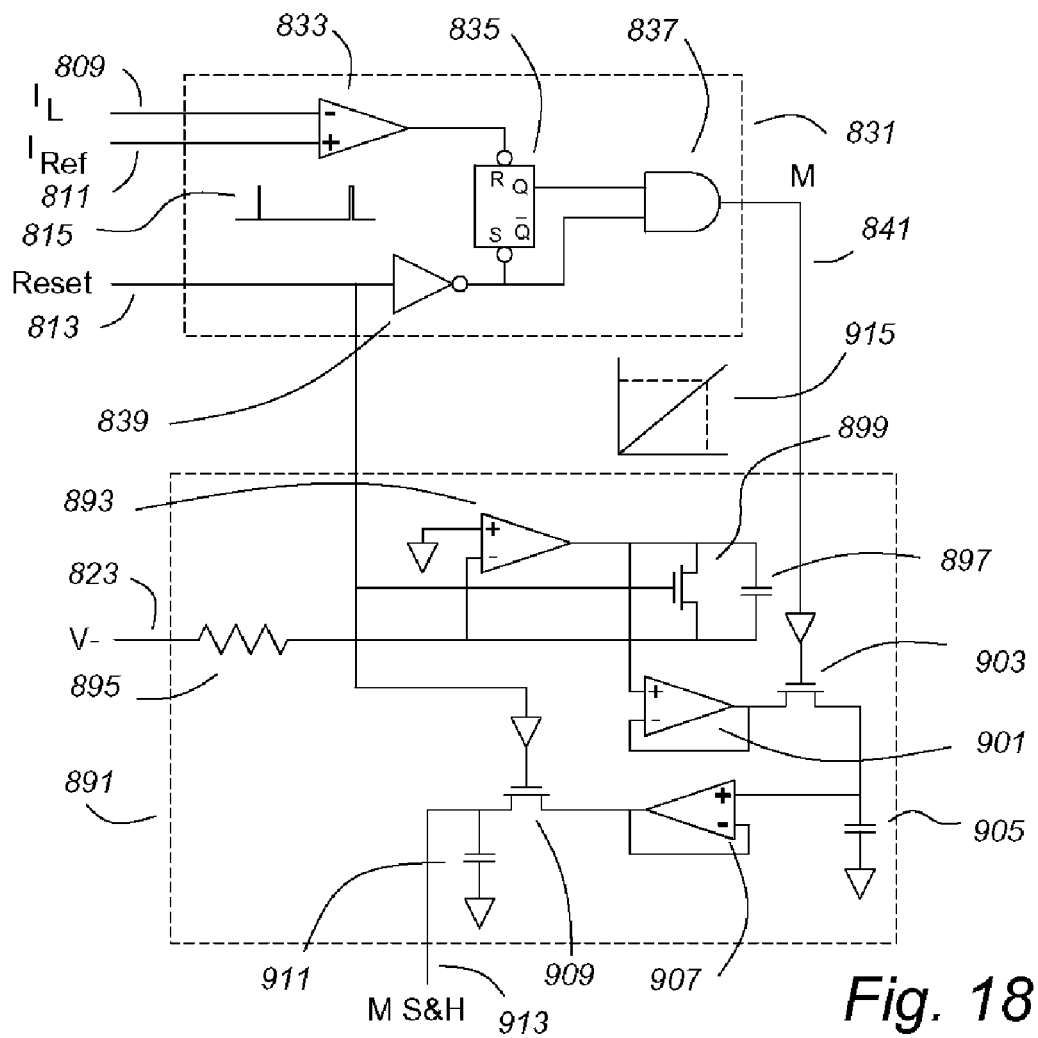

As shown in FIG. 16, and more particularly in FIG. 17, a comparator network 851 comprising three comparators 853, 855 and 857 determines which of inputs $|V_a|$ 803, $|V_b|$ 805 or $|V_c|$ 807 has the highest magnitude. This information is latched at the beginning of the switching cycle by the reset input (inverted) in three flip-flops 859, 861 and 863 so that the status will be static throughout each switching cycle. Three and gates 865, 867 and 869 ensure that only one channel will be true, as there could be a race condition if two of the inputs $|V_a|$ 803, $|V_b|$ 805 or $|V_c|$ 807 are nearly the same value. The outputs of the three and gates 865, 867 and 869 are anded with the internal signal M 841 in three and gates 871, 873 and 877 to generate three internal signals Ma 883, Mb 885 and Mc 887 respectively. One of the internal signals Ma 883, Mb 885 or Mc 887 will be enabled and will output a pulse conforming to timing of the internal signal M 841. The outputs of the three and gates 865, 867 and 869 also are the internal signals Amax 877, Bmax 879 and Cmax 881 respectively.

The duration of the pulse M 841 must be sampled and held to implement the functions of equations [44] and [45]. This sample and hold circuit 891 is shown in detail in FIG. 18. An integrator comprising an amplifier 893, a capacitor 897 and a resistor 895 connected to a fixed negative voltage V− 823 generates an integrator ramp voltage, shown conceptually by the graph 915. The integrator ramp voltage is reset periodically by the reset input 813 turning on briefly a switch 899, shown as an example, not a limitation, as a MOSFET. The integrator ramp voltage is buffered by an amplifier 901 that is configured as a voltage follower. The output voltage of the amplifier 901 is sampled and held on a capacitor 905 at the end of the internal signal M 841, when the internal signal M goes low and turns off a switch 903. The voltage on the capacitor 905 is buffered by an amplifier 907 that is configured as a voltage follower, and the output voltage of the amplifier 907 is sampled and held on a capacitor 911 when the reset input 813 goes high and momentarily turns on a switch 909 to hold the sampled voltage to provide the $D_m$ function, $D_{max}$ in [44] and [45] as the internal signal M S&H 913.

Figure 19:
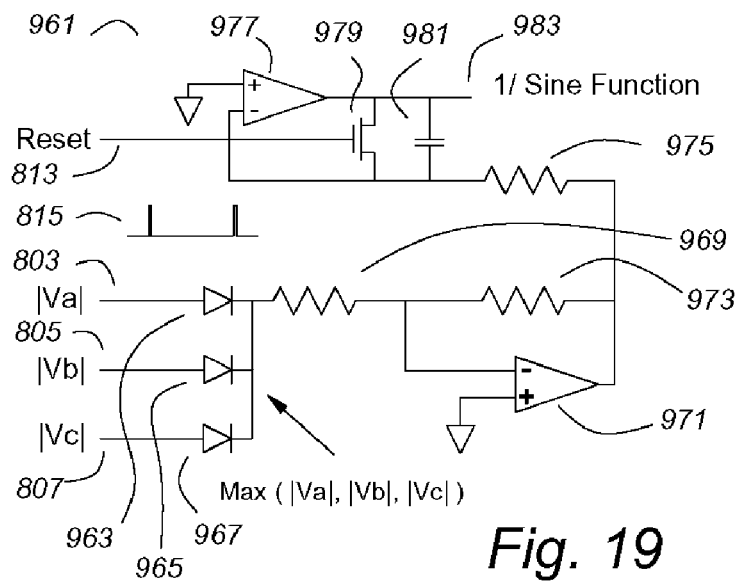

Equations [44] and [45] require a denominator term $\max(V_1, V_2, V_3)$ which can be implemented in the 1/Sine Function circuit 961, shown in FIG. 16 and in more detail in FIG. 19, by first by using a diode circuit comprising three diodes 963, 965 and 967 to determine which of the inputs $|Va|$ 803, $|Vb|$ 805 or $|Vc|$ 807 has the greater voltage. The maximum voltage is then inverted and scaled by an inverting amplifier circuit comprising an amplifier 971, and input resistor 969 and a feedback resistor 973. This function determines the slope of the charging voltage of an integrator comprising an amplifier 977, a resistor 975 and a capacitor 981, to provide the denominator term required for [44] and [45] as the internal signal 1/Sine Function 983. The integrator ramp voltage is reset periodically by the reset input 803 going high and turning on a switch 979.

Figure 20:
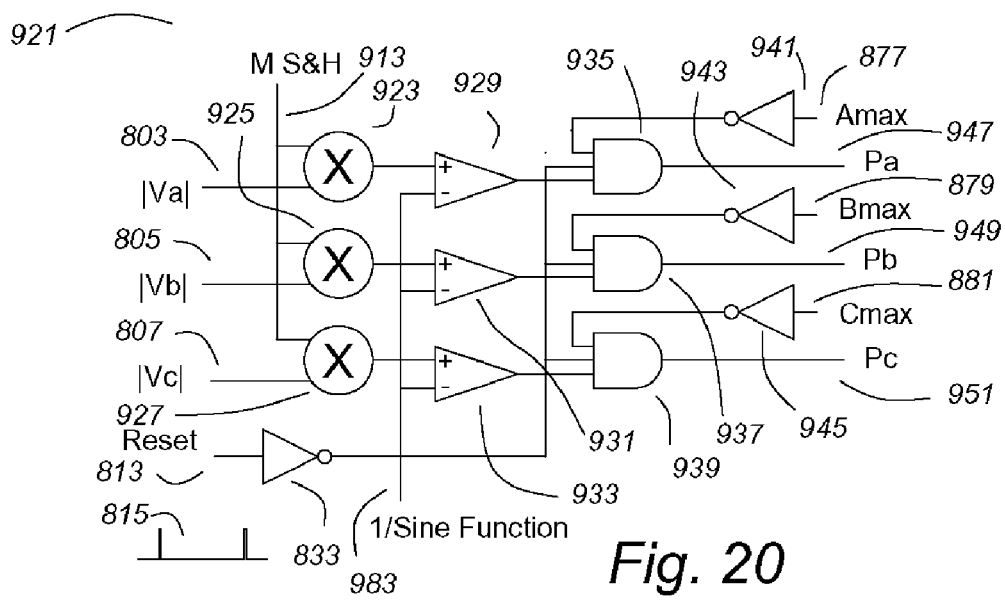

The internal signal M S&H 913 and the internal signal 1/Sine Function 983 are used to generate the duty cycle pulses for the two phases that do not have the maximum voltage, as shown in the Pulse 2 & 3 circuit 921 in FIG. 16 and in more detail in FIG. 20. The M S&H internal signal 913 is a gain term on the voltage of the three inputs $|Va|$ 803, $|Vb|$ 805 and $|Vc|$ 807, and they are multiplied respectively in three multipliers 923, 925 and 927. When the respective product voltages from the three multipliers 923, 925 and 927 reach the slope intercept with the voltage of the internal signal 1/Sine Function 983, the outputs of the respective comparators 929, 931 and 935 go low, and end the respective pulses. The outputs of the comparators 929, 931 and 933 are anded in respective and gates 935, 937 and 939 so that the output of the and gates 935, 937, and 939 are held low during reset and also if the respective phase is the maximum phase as determined by the internal signals Amax 877, Bmax 879 and Cmax 881 respectively, inverted by respective inverters 941, 943 and 945, so that only two of the three pulses internal signals Pa 947, Pb 949 and Pc 941 are passed through to the respective or gates 985, 987 and 989. As shown in FIGS. 15 and 16 these two pulses generate the output Sa 817, Sb 819 and Sc 821 for the two phases that are not maximum, implementing [44] and [45], while the output Sa 817, Sb 819 or Sc 821 for the phase that is maximum is derived from the current mode pulse circuit 831, implementing [43].

The equations [44] and [45] in the Summary of the Invention were derived for a three phase buck converter having power factor correction, where the ratio of the voltages and the ratio of the currents is the same. For use with a three phase ac input which may have a free-wheeling power source, it is preferred to use a form of the equations referring not to the voltages but to the currents, as follows, because the voltages may not be well behaved and may not be suitable for control use.

$$D_2 = D_1 \frac{|I_2|}{|I_1|} \quad [47]$$

$$D_3 = D_1 \frac{|I_3|}{|I_1|} \quad [48]$$

While a three phase power converter is discussed, comparable circuits using two or more phases can be implemented similarly and are equivalent for the teachings of this invention.

FIG. 21 shows a three phase buck converter 1001 in which the rectifiers' function has been combined with the switches' function. To do this, the switches must be ac switches, that is, they must have the characteristic that they can conduct current in either direction when and block voltage of either polarity when off. Back to back MOSFETs fit these criteria, as an example, not a limitation.

Using ac switches has several advantages, not the least of which is that the input rectifiers can be eliminated, although the rectifier function is not as It is performed by the ac switches and the rectifier logic, timing and drives is added to the control for the switches. Another advantage is that power can flow in either direction, a characteristic that could be very useful. The three phase buck converter 1001 of FIG. 21 is similar in many respects to the three phase buck converter 101 of FIG. 4.

A three phase ac voltage source 1003 comprises three ac voltage inputs A 1005, B 1007 and C 1009, Δ connected. There are some good reasons for preferring a Δ connection over a Y connection, among them the ability to retain three phase characteristics even if a phase is lost. However, the three phase buck converter 1001 requires a neutral 1035, not necessarily to handle line frequency currents, but to handle ripple currents at the pwm frequency. This can be satisfied by three capacitors 1037m 1039 and 1041 on the input of the three phase buck converter 1001. Because they carry high frequency ripple currents, they preferably will be downstream of any input emi filters.

The ac voltage inputs A 1005, B 1007 and C 1009 connect to three positive side ac switches, Sa+ 1011, Sb+ 1013 and Sc+ 1015 as well as to three negative side ac switches Sa– 1017, Sb– 1019 and Sc– 1021. The positive side ac switches are used when the respective ac voltage inputs are positive, and the negative side ac switches are used when the respective ac voltage inputs are negative.

Two ac switches function as synchronous rectifiers. Scr+ 1023 and Scr– 1025. An inductor L 1027 and a capacitor C 1029 complete the three phase buck converter 1001, and the discussion of that three phase buck converter 101 is applicable. The dc voltage output 1031 and the dc common return VoRtn 1033 provide output power to an external load, not shown.

Figure 22:
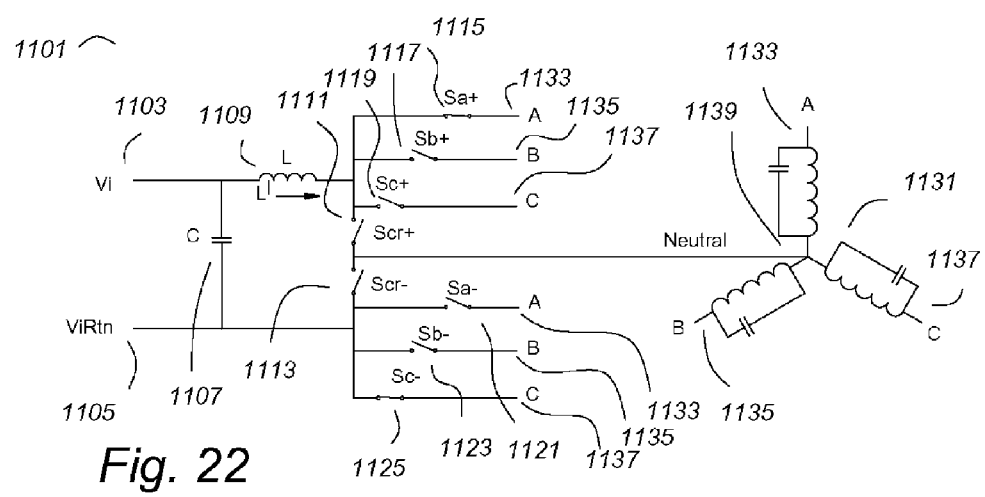

When built using synchronous rectifiers, prior art dc—dc buck converters and dc—dc boost converters are reciprocal devices. If a dc—dc buck converter operates with reverse power flow, it is a dc—dc boost converter If a dc—dc boost converter operates with reverse power flow, it is a dc—dc buck converter. All of the principles of operation and governing equations are the same if reconciled correctly. The same is true of the three phase buck converter. The three phase boost converter 1101 of FIG. 22 is the three phase buck converter 1001 of FIG. 21, drawn in mirror image with the input and the output swapped, except in FIG. 21 the power source 1003 is Δ connected and in FIG. 22 the load 1131 is Y connected. All of the relationships and equations developed above in the Summary of the Invention are applicable if the labels and units are reconciled. The equations may be easier to understand if rearranged and the terms collected differently, but no relationship is different. Care must be taken to apply the terminology correctly. As an example, in common jargon of the art, the common usage of the term "duty cycle" applied to a dc—dc buck converter and to a dc—dc boost converter refer to different switches. This and similar differences must be reconciled to see the reciprocal relationship.

A dc voltage input Vi 1103 and a filter capacitor 1107 supply a dc current to an inductor L 1109 and then to three positive ac switches Sa+ 1115, Sb+ 1117 and Sc+ 1119 as well as to a positive synchronous rectifier Scr+ 1111. The dc common return ViRtn 105 connects to the low side of the capacitor C 1107 and to three negative ac switches Sa– 1133, Sb– 1135 and Sc 1137 as well as to a negative synchronous rectifier Scr– 113. The ac outputs A 1133, B 1135 and c 1137 connect to a three phase load 1131. The three phase neutral 1139 connects to the common connection between the positive and negative synchronous rectifiers Scr+ 1111 and Scr– 1113.

In operation, the closure of the three positive ac switches Sa+ 1115, Sb+ 1117 and Sc+ 1119 is mutually exclusive, and the positive synchronous rectifier Scr+ is closed if none of the positive ac switches is closed. Similarly, the closure of the three negative ac switches Sa– 1133, Sb– 1135 and Sc 1137 is mutually exclusive, and the negative synchronous rectifier Scr– 1113 is closed if none of the negative ac switches is closed. In normal operation, one of the positive side switches and one of the negative side switches will be closed in accordance with the equations [28] through [30], if voltage mode control is used, or equations [43] through [45] for current mode control. In either case, a means for feedback control may modulate the duty cycles of the switches, and equation [37] is useful for monitoring the three phase ac output voltages, as it returns a dc voltage.

While the three phase ac voltage input 1003 of FIG. 21 and the other examples above are likely to be fixed commercial frequencies, that is not necessarily so, and it certainly is not so for the three phase ac voltage output 1131 of FIG. 22. Either may be any frequency and in the equations it only effects the rate of change of the phase angle X. One difference is important, however. Where as when the three phase ac voltage is a power source, the phase voltages may be used as a source for the sine functions required to implement the respective duty cycles of the switches, in the case of generating a three phase ac voltage output, the sine functions must be generated by the control. However, there are no restraints on the frequency, up to the limits imposed by the pwm switching frequency. The frequency can be very low, even zero, and the phasing can reverse so long as the duty cycles of the respective switches are correct for the phase angle on an instantaneous basis.

Figure 23:
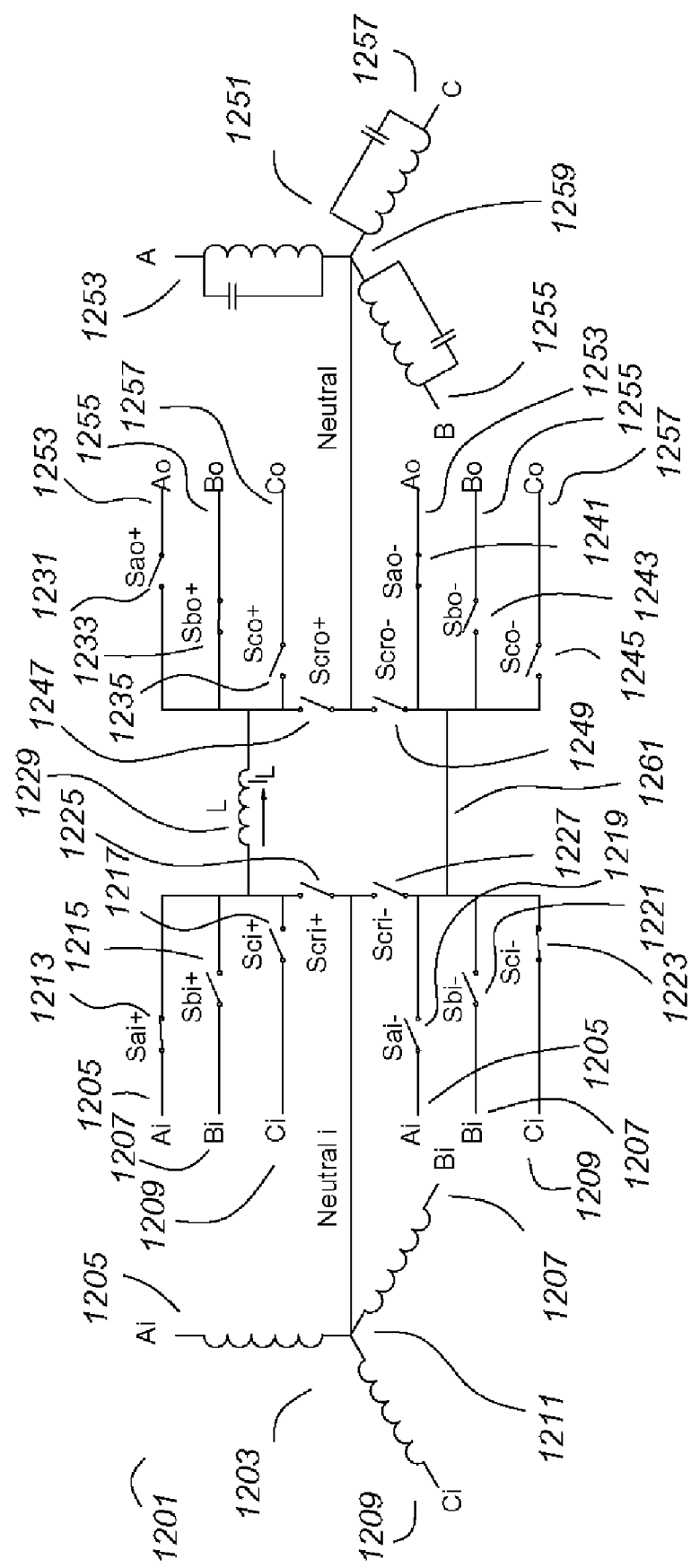

FIG. 23 shows the logical extension of the above discussion. The three phase ac buck-boost frequency converter 1201 has a three phase buck converter input and a three phase boost converter output with a common inductor L 1229 linking them. No bulk storage capacitor is needed. The only thing that the two halves have in common are the inductor L 1229 and the current $I_L$ through it. The three phase ac input 1203 for three phase buck converter stage may operate from commercial line frequency power source, but that is not necessary, it can operate from any frequency, even zero frequency so long as the phase angle is instantaneously correct for the control of the ac switches.

A three phase ac voltage source 1203 comprises three ac voltage inputs Ai 1205, Bi 1207 and Ci 1209, and a Neutral i 1211. The ac voltage inputs Ai 1205, Bi 1207 and Ci 1209 connect to three positive side ac switches, Sai+ 1213, Sbi+ 11215 and Sci+ 1217 as well as to three negative side ac switches Sai– 1219, Sbi– 1221 and Sci– 1223. The positive side ac switches are used when the respective ac voltage inputs are positive, and the negative side ac switches are used when the respective ac voltage inputs are negative. Two ac switches function as synchronous rectifiers. Scri+ 1225 and Scri– 1227.

The inductor L 1229 connects to three positive ac switches Sao+ 11231, Sbo+ 1233 and Sco+ 1235 as well as to a positive synchronous rectifier Scr+ 1247. The dc common return 1261 connects to three negative ac switches Sao– 1241, Sbo– 1243 and Sco– 1245 as well as to a negative synchronous rectifier Scr– 1249. The ac outputs Ao 1253, Bo 1257 and Co 1257 connect to a three phase load 1251. The three phase Neutral o 1259 connects to the common connection between the positive and negative synchronous rectifiers Scro+ 1247 and Scro– 1249.

The control of each side is in accordance with the equations [28] through [30], if voltage mode control is used, or equations [43] through [45] for current mode control. In either case, a means for feedback control may modulate the duty cycles of the switches, and equation [37] is useful for monitoring the three phase ac output voltages, as it returns a dc voltage. An additional factor is the magnitude of the inductor current $I_L$. It is somewhat arbitrary, but is preferably chosen so that the duty cycles of the switches are optimized. Accordingly, it is preferred to use current mode control on the input and voltage mode control on the output.

What is claimed is:

1. A three phase buck converter having input current control for converting a three phase ac input to a dc output comprising:
a dc voltage output Vo and a dc common return;
a phase A input having a means for rectifying a phase A ac current Ia having a nominal value of IpSinX to a phase A rectified current |Ia| having a nominal value Ip|SinX|,
where Ip is the desired peak value of the three phase ac input current and where X is the desired instantaneous phase angle of the phase A ac current;
a phase B input having a means for rectifying a phase B ac current Ib having a nominal value of IpSin(X+120°) to a phase B rectified current |Ib| having a nominal value Ip|Sin(X+120°)|;
a phase C input having a means for rectifying a phase C ac current Ic having a nominal value of IpSin(X+240°) to a phase A rectified current |Ic| having a nominal value Ip|Sin(X+240°)|;
an inductor having an input terminal and an output terminal;
at least a first phase A switch connected between the means for rectifying the phase A current and the input terminal of the inductor;
at least a first phase B switch connected between the means for rectifying the phase B current and the input terminal of the inductor;
at least a first phase C switch connected between the means for rectifying the phase C current and the input terminal of the inductor;
at least a first catch rectifier having an input rectifier terminal connected to the dc common return and an output rectifier terminal connected to the input of the inductor for conducting the current in the inductor when there is not at least one of the at least a first phase A switch, the at least a first phase B switch and the at least a first phase C switch in an on state;
a capacitor having a first terminal connected to the output terminal of the inductor and the dc voltage output and having a second terminal connected to the dc common return;
means for controlling the switching of the at least a first phase A switch so that the phase A switch has a duty cycle Da equal to K|SinX|,
where K is a gain factor;
means for controlling the switching of the at least a first phase B switch so that the phase B switch has a duty cycle Db equal to K|Sin(X+120°)|; and
means for controlling the switching of the at least a first phase C switch so that the phase C switch has a duty cycle Dc equal to K|Sin(X+240°)|.

2. The three phase buck converter of claim 1 wherein the gain factor K has a nominal value of $$K = \frac{2V_o}{3V_p}$$

where Vo is the desired voltage of the dc voltage output and Vp is the actual peak voltage of the three phase ac input.

3. The three phase buck converter of claim 1 wherein the gain factor K is modulated by a means for feedback control as a function of the value of the dc voltage output to control precisely the value of the dc voltage output.

4. The three phase buck converter of claim 1 wherein the gain factor K is modulated by a means for input voltage feed-forward control to compensate for variations in the voltage of the three phase ac input.

5. The three phase buck converter of claim 1 wherein the gain factor K is modulated as a function of $1/V_p^2$ to compensate for variations in the voltage of the three phase ac input, and where Vp is the actual peak voltage of the three phase ac input.

6. The three phase buck converter of claim 1 further comprising a dc—dc converter connected to the dc output voltage to provide a modified dc voltage output having dielectric isolation.

7. The three phase buck converter of claim 1 further comprising a dc—dc converter connected to the dc output voltage to provide a modified dc voltage output having a different dc voltage value.

8. The three phase buck converter of claim 1 wherein the means for rectifying a phase A ac current Ia is a positive phase A rectifier and a negative phase A rectifier, the positive phase A rectifier rectifying the phase A input current Ia when the phase A input current Ia is positive and the negative phase A rectifier rectifying the phase A input current Ia when the phase A input current Ia is negative;
the means for rectifying a phase B ac current Ib is a positive phase B rectifier and a negative phase B rectifier, the positive phase B rectifier rectifying the phase B input current Ib when the phase B input current Ib is positive and the negative phase B rectifier rectifying the phase B input current Ib when the phase B input current Ib is negative;
the means for rectifying a phase C ac current Ic is a positive phase C rectifier and a negative phase C rectifier, the positive phase C rectifier rectifying the phase C input current Ic when the phase C input current Ic is positive and the negative phase C rectifier rectifying the phase C input current Ic when the phase C input current Ic is negative;
the at least a first phase A switch is a positive phase A switch connected between the positive phase A rectifier and the input of the inductor, the positive phase A switch operating when the phase A input current Ia is positive;
the at least a first phase B switch is a positive phase B switch connected between the positive phase B rectifier and the input of the inductor, the positive phase B switch operating when the phase B input current Ib is positive;
the at least a first phase C switch is a positive phase C switch connected between the positive phase C rectifier and the input of the inductor, the positive phase C switch operating when the phase C input current Ic is positive;
the at least a first catch rectifier is first and second catch rectifiers connected in series with the common connection between the first and second catch rectifiers connected to a neutral input of the three phase ac input;
further comprising
a negative phase A switch connected between the negative phase A rectifier and the dc common return, the negative phase A switch operating when the phase A input current Ia is negative and the negative phase A switch;
a negative phase B switch connected between the negative phase B rectifier and the dc common return, the negative phase B switch operating when the phase B input current Ib is negative and the negative phase B switch, and;

a negative phase C switch connected between the negative phase C rectifier and the dc common return, the negative phase C switch operating when the phase C input current Ic is negative and the negative phase C switch.

9. The three phase buck converter of claim 1 wherein the at least a first phase A switch is a phase A primary switching circuit of a phase A isolation transformer and the at least a first phase A switch is connected to the input terminal of the inductor through the phase A isolation transformer and a phase A secondary rectifying circuit;

the at least a first phase B switch is a phase B primary switching circuit of a phase B isolation transformer and the at least a first phase B switch is connected to the input terminal of the inductor through the phase B isolation transformer and a phase B secondary rectifying circuit;

the at least a first phase C switch is a phase C primary switching circuit of a phase C isolation transformer and the at least a first phase C switch is connected to the input terminal of the inductor through the phase C isolation transformer and a phase C secondary rectifying circuit.

10. The three phase buck converter of claim 1 wherein the means for rectifying a phase A ac current Ia, the means for rectifying a phase B ac current Ib, the means for rectifying a phase C ac current Ic and the at least a first catch rectifier are synchronous rectifiers.

11. The three phase buck converter of claim 8 wherein the phase A switch, the negative phase A switch, the positive phase B switch, the negative phase B switch, the positive phase C switch and the negatives phase C switch are ac switches; and the phase A rectifier, the negative phase A rectifier, the positive phase B rectifier, the negative phase B rectifier, the positive phase C rectifier and the negatives phase C rectifier are the phase A switch, the negative phase A switch, the positive phase B switch, the negative phase B switch, the positive phase C switch and the negatives phase C switch, respectively, operate as synchronous rectifiers as well as switches.

12. A three phase buck converter having input current control for converting a three phase ac input to a dc output comprising:

a dc voltage output Vo and a dc common return;

a phase A input having a means for rectifying a phase A ac current Ia having a nominal value of IpSinX to a phase A rectified current |Ia| having a nominal value Ip|SinX|, where Ip is the desired peak value of the three phase ac input current and where X is the desired instantaneous phase angle of the phase A ac current;

a phase B input having a means for rectifying a phase B ac current Ib having a nominal value of IpSin(X+120°) to a phase B rectified current |Ib| having a nominal value Ip|Sin(X+120°)|;

a phase C input having a means for rectifying a phase C ac current Ic having a nominal value of IpSin(X+240°) to a phase A rectified current |Ic| having a nominal value Ip|Sin(X+240°)|;

an inductor having an input terminal and an output terminal;

at least a first phase A switch connected between the means for rectifying the phase A current and the input terminal of the inductor;

at least a first phase B switch connected between the means for rectifying the phase B current and the input terminal of the inductor;

at least a first phase C switch connected between the means for rectifying the phase C current and the input terminal of the inductor;

at least a first catch rectifier having an input rectifier terminal connected to the dc common return and an output rectifier terminal connected to the input of the inductor for conducting the current in the inductor when there is not at least one of the at least a first phase A switch, the at least a first phase B switch and the at least a first phase C switch in an on state;

a capacitor having a first terminal connected to the output terminal of the inductor and the dc voltage output and having a second terminal connected to the dc common return;

and wherein at any instant of time the one of the phase A ac current, the phase B ac current and the phase C ac current that has the highest magnitude is designated the phase 1 current and its current magnitude is designated as I1;

the one of the phase A ac current, the phase B ac current and the phase C ac current that has the second highest magnitude is designated the phase 2 current and its current magnitude is designated as I2 the one of the phase A ac current, the phase B ac current and the phase C ac current that has the lowest magnitude is designated the phase 3 current and its current magnitude is designated as I3 the one of the at least a first phase A switch, the at least a first phase B switch and the at least a first phase C switch that has the same phase as phase 1 is designated as switch 1 and its duty cycle is designated as D1 the one of the at least a first phase A switch, the at least a first phase B switch and the at least a first phase C switch that has the same phase as phase is designated as switch 3 and its duty cycle is designated as D3 the one of the at least a first phase A switch, the at least a first phase B switch and the at least a first phase C switch that has the same phase as phase is designated as switch 3 and its duty cycle is designated as D3 a means for controlling the switching of switch 1, switch 2 and switch 3 such that the duty cycle D1 of switch 1 terminates when the current in the inductor equal a reference current as determined by a means for feedback control to precisely control the dc output current Vo;

the duty cycle D2 of switch 2 is controlled to be $$D2 = D1\frac{I2}{I1}$$

and the duty cycle D3 of the switch 3 is controlled to be $$D3 = D1\frac{I3}{I1}.$$

13. The three phase buck converter of claim 12 further comprising a dc—dc converter connected to the dc output to provide a modified dc output having dielectric isolation.

14. The three phase buck converter of claim 12 further comprising a dc—dc converter connected to the dc output to provide a modified dc output having a different dc voltage value.

15. The three phase buck converter of claim 12 wherein
the means for rectifying a phase A ac current Ia is a positive phase A rectifier and a negative phase A rectifier, the positive phase A rectifier rectifying the phase A input current Ia when the phase A input current Ia is positive and the negative phase A rectifier rectifying the phase A input current Ia when the phase A input current Ia is negative;
the means for rectifying a phase B ac current Ib is a positive phase B rectifier and a negative phase B rectifier, the positive phase B rectifier rectifying the phase B input current Ib when the phase B input current Ib is positive and the negative phase B rectifier rectifying the phase B input current Ib when the phase B input current Ib is negative;
the means for rectifying a phase C ac current Ic is a positive phase C rectifier and a negative phase C rectifier, the positive phase C rectifier rectifying the phase C input current Ic when the phase C input current Ic is positive and the negative phase C rectifier rectifying the phase C input current Ic when the phase C input current Ic is negative;
the at least a first phase A switch is a positive phase A switch connected between the positive phase A rectifier and the input of the inductor, the positive phase A switch operating when the phase A input current Ia is positive;
the at least a first phase B switch is a positive phase B switch connected between the positive phase B rectifier and the input of the inductor, the positive phase B switch operating when the phase B input current Ib is positive;
the at least a first phase C switch is a positive phase C switch connected between the positive phase C rectifier and the input of the inductor, the positive phase C switch operating when the phase C input current Ic is positive;
the at least a first catch rectifier is first and second catch rectifiers connected in series with the common connection between the first and second catch rectifiers connected to a neutral input of the three phase ac input current;
further comprising
a negative phase A switch connected between the negative phase A rectifier and the dc common return, the negative phase A switch operating when the phase A input current Ia is negative and the negative phase A switch;
a negative phase B switch connected between the negative phase B rectifier and the dc common return, the negative phase B switch operating when the phase B input current Ib is negative and the negative phase B switch; and
a negative phase C switch connected between the negative phase C rectifier and the dc common return, the negative phase C switch operating when the phase C input current Ic is negative and the negative phase C switch.

16. The three phase buck converter of claim 12 wherein
the at least a first phase A switch is a phase A primary switching circuit of a phase A isolation transformer and the at least a first phase A switch is connected to the input terminal of the inductor through the phase A isolation transformer and a phase A secondary rectifying circuit;
the at least a first phase B switch is a phase B primary switching circuit of a phase B isolation transformer and the at least a first phase B switch is connected to the input terminal of the inductor through the phase B isolation transformer and a phase B secondary rectifying circuit;
the at least a first phase C switch is a phase C primary switching circuit of a phase C isolation transformer and the at least a first phase C switch is connected to the input terminal of the inductor through the phase C isolation transformer and a phase C secondary rectifying circuit.

17. The three phase buck converter of claim 12 wherein the means for rectifying a phase A ac current Ia, the means for rectifying a phase B ac current Ib, the means for rectifying a phase C ac current Ic and the at least a first catch rectifier are synchronous rectifiers.

18. The three phase buck converter of claim 15 wherein the phase A switch, the negative phase A switch, the positive phase B switch, the negative phase B switch, the positive phase C switch and the negative phase C switch are ac switches; and
the phase A rectifier, the negative phase A rectifier, the positive phase B rectifier, the negative phase B rectifier, the positive phase C rectifier and the negatives phase C rectifier are the positive phase A switch, the negative phase A switch, the positive phase B switch, the negative phase B switch, the positive phase C switch and the negatives phase C switch, respectively, operating as synchronous rectifiers as well as switches.

19. A three phase boost converter for converting a dc input to a three phase ac output current comprising:
a dc input and a dc common return;
a phase A output having a phase A ac current Ia having a nominal value of IpSinX,
where Ip is the desired peak value of the three phase ac output current and where X is the desired instantaneous phase angle of the phase A ac current;
a phase B output having a phase B ac current Ib having a nominal value of IpSin(X+120°);
a phase C output having a phase C ac current Ic having a nominal value of IpSin(X+240°);
an ac neutral output for connecting to the common connection of a Y connected three phase load;
an inductor having an input terminal and an output terminal;
a positive phase A switch connected between the phase A output and the output terminal of the inductor;
a positive phase B switch connected between the phase B output and the output terminal of the inductor;
a positive phase C switch connected between the phase C output and the output terminal of the inductor;
a negative phase A switch connected between the phase A output and the dc common return;
a negative phase B switch connected between the phase B output and the dc common return;
a negative phase C switch connected between the phase C output and the dc common return;
a positive synchronous rectifier connected between the neutral ac output and the output of the inductor for conducting the current in the inductor when there is not at least one of the positive phase A switch, the positive phase B switch and the positive phase C switch in an on state;
a negative synchronous rectifier connected between the dc common return and the ac neutral output for conducting the current in the inductor when there is not at least one of the negative phase A switch, the negative phase B switch and the negative phase C switch in an on state;

means for controlling the switching of the positive phase A switch so that the positive phase A switch has a duty cycle Da equal to K|SinX| when the phase A output current Ia is positive, where K is a gain factor;

means for controlling the switching of the negative phase A switch so that the negative phase A switch has a duty cycle Da equal to K|SinX| when the phase A output current Ia is negative means for controlling the switching of the positive phase B switch so that the positive phase B switch has a duty cycle Db equal to K|Sin(X+120°)| when the phase B output current Ib is positive;

means for controlling the switching of the negative phase B switch so that the negative phase B switch has a duty cycle Db equal to K|Sin(X+120°)| when the phase B output current Ib is negative;

means for controlling the switching of the positive phase C switch so that the positive phase C switch has a duty cycle Dc equal to K|Sin(X+240°)| when the phase C output current Ic is positive;

means for controlling the switching of the negative phase C switch so that the negative phase C switch has a duty cycle Dc equal to K|Sin(X+240°)| when the phase C output current Ic is negative;- and means for controlling the gain factor K so as to regulate the three phase ac output.

20. The three phase boost converter of claim 19 further comprising:

a three phase buck converter having input current control as the dc input of the three phase boost converter for converting a three phase ac input to a dc output and a dc common return, which is the dc input and the dc common return of the three phase boost converter, comprising:

a phase D input having a means for rectifying a phase D ac current Id having a nominal value of IqSinZ to a phase D rectified current |Id| having a nominal value Iq|SinZ|, where Iq is the desired peak value of the three phase ac input current and where Z is the desired instantaneous phase angle of the phase D ac current;

a phase E input having a means for rectifying a phase E ac current Ie having a nominal value of IqSin(Z+120°) to a phase E rectified current |Ie| having a nominal value Iq|Sin(Z+120°)|;

a phase F input having a means for rectifying a phase F ac current If having a nominal value of IqSin(Z+240°) to a phase D rectified current |If| having a nominal value Iq|Sin(Z+240°)|;

at least a first phase D switch connected between the means for rectifying the phase D current and the input terminal of the inductor;

at least a first phase E switch connected between the means for rectifying the phase E current and the input terminal of the inductor;

at least a first phase F switch connected between the means for rectifying the phase F current and the input terminal of the inductor;

at least a first catch rectifier having an input rectifier terminal connected to the dc common return and an output rectifier terminal connected to the input of the inductor for conducting the current in the inductor when there is not at least one of the at least a first phase D switch, the at least a first phase E switch and the at least a first phase F switch in an on state;

means for controlling the switching of the at least a first phase D switch so that the phase D switch has a duty cycle Dd equal to M|SinZ|, where M is a gain factor;

means for controlling the switching of the at least a first phase E switch so that the phase E switch has a duty cycle De equal to M|Sin(Z+120°)|; and means for controlling the switching of the at least a first phase F switch so that the phase F switch has a duty cycle Df equal to M|Sin(Z+240°)|.

21. The three phase boost converter of claim 19 further comprising:

a three phase buck converter having input current control as the dc input of the three phase boost converter, for converting a three phase ac input to a dc output and a dc common return, which are the dc input and the dc common return of the three phase boost converter, comprising:

a phase D input having a means for rectifying a phase D ac current Id having a nominal value of IqSinZ to a phase D rectified current |Id| having a nominal value Iq|SinZ|, where Iq is the desired peak value of the three phase ac input current and where Z is the desired instantaneous phase angle of the phase D ac current;

a phase E input having a means for rectifying a phase E ac current Ie having a nominal value of IqSin(Z+120°) to a phase E rectified current |Ie| having a nominal value Iq|Sin(Z+120°)|;

a phase F input having a means for rectifying a phase F ac current If having a nominal value of IqSin(Z+240°) to a phase D rectified current |If| having a nominal value Iq|Sin(Z+240°)|;

at least a first phase D switch connected between the means for rectifying the phase D current and the input terminal of the inductor;

at least a first phase E switch connected between the means for rectifying the phase E current and the input terminal of the inductor;

at least a first phase F switch connected between the means for rectifying the phase F current and the input terminal of the inductor;

at least a first catch rectifier having an input rectifier terminal connected to the dc common return and an output rectifier terminal connected to the input of the inductor for conducting the current in the inductor when there is not at least one of the at least a first phase D switch, the at least a first phase E switch and the at least a first phase F switch in an on state;

and wherein at any instant of time the one of the phase D ac current, the phase E ac current and the phase F ac current that has the highest magnitude is designated the phase 1 current and its current magnitude is designated as I1;

the one of the phase D ac current, the phase E ac current and the phase F ac current that has the second highest magnitude is designated the phase 2 current and its current magnitude is designated as I2 the one of the phase D ac current, the phase E ac current and the phase F ac current that has the lowest magnitude is designated the phase 3 current and its current magnitude is designated as I3 the one of the at least a first phase D switch, the at least a first phase E switch and the at least a first phase F switch that has the same phase as phase 1 is designated as switch 1 and its duty cycle is designated as D1 the one of the at least a first phase D switch, the at least a first phase E switch and the at least a first phase F switch that has the same phase as phase 2 is designated as switch 2 and its duty cycle is designated as D2 the one of the at least a first phase D switch, the at least a first phase E switch and the at least a first phase F switch that has the same phase as phase 3 is designated as switch 3 and its duty cycle is designated as D3 a means for controlling the switching of switch 1, switch 2 and switch 3 such that the duty cycle D1 of switch 1 terminates when the current in the inductor equal a reference current as determined by a means for feedback control to precisely control the dc output current Vo;

the duty cycle D2 of switch 2 is controlled to be $$D2 = D1\frac{I2}{I1}$$

and the duty cycle D3 of the switch 3 is controlled to be $$D3 = D1\frac{I3}{I1}.$$

* * * * *